United States Patent
Nakura (10) Patent No.: US 8,673,499 B2
(45) Date of Patent: *Mar. 18, 2014

(54) LITHIUM ION SECONDARY BATTERY

(75) Inventor: Kensuke Nakura, Osaka (JP)

(73) Assignee: Panasonic Corporation, Osaka (JP)

( * ) Notice: Subject to any disclaimer, the term of this patent is extended or adjusted under 35 U.S.C. 154(b) by 1575 days.

This patent is subject to a terminal disclaimer.

(21) Appl. No.: 11/914,343

(22) PCT Filed: Jun. 12, 2006

(86) PCT No.: PCT/JP2006/311709
§ 371 (c)(1),
(2), (4) Date: Nov. 13, 2007

(87) PCT Pub. No.: WO2006/134851
PCT Pub. Date: Dec. 21, 2006

(65) Prior Publication Data
US 2009/0081548 A1    Mar. 26, 2009

(30) Foreign Application Priority Data

Jun. 16, 2005 (JP) ................................ 2005-176514

(51) Int. Cl.
*H01M 4/13* (2010.01)
(52) U.S. Cl.
USPC .................. 429/231.3; 429/231.1; 429/231.5; 429/231.6; 429/223; 429/224; 429/218.1; 429/330; 429/199
(58) Field of Classification Search
USPC ............. 429/231.3, 231.1, 231.5, 231.6, 223, 429/224, 218.1, 330, 199
See application file for complete search history.

(56) References Cited

U.S. PATENT DOCUMENTS

| | | | |
|---|---|---|---|
| 5,631,105 A | | 5/1997 | Hasegawa et al. |
| 5,679,481 A | * | 10/1997 | Takanishi et al. ............. 429/223 |
| 6,730,435 B1 | | 5/2004 | Nakane et al. |
| 6,855,461 B2 | * | 2/2005 | Lampe-Onnerud et al. ........................ 429/231.3 |
| 6,921,609 B2 | * | 7/2005 | Lampe-Onnerud et al. ........................ 429/231.3 |
| 2002/0061444 A1 | | 5/2002 | Kweon et al. |
| 2003/0129495 A1 | | 7/2003 | Yamato et al. |
| 2004/0224230 A1 | | 11/2004 | Yanagida et al. |
| 2005/0095507 A1 | | 5/2005 | Kim et al. |

FOREIGN PATENT DOCUMENTS

| | | | |
|---|---|---|---|
| JP | 09-035715 | | 2/1997 |
| JP | 10-021958 | | 1/1998 |
| JP | 10-027611 | * | 1/1998 |
| JP | 10-255795 | | 9/1998 |
| JP | 11-016566 | | 1/1999 |
| JP | 11-040154 | | 2/1999 |
| JP | 2002-015740 | | 1/2002 |
| JP | 2002-075367 | | 3/2002 |
| JP | 2003-034537 | * | 2/2003 |
| JP | 2003-034538 | * | 2/2003 |
| JP | 2003-173775 | | 6/2003 |
| JP | 2004-111076 | | 4/2004 |
| JP | 2005-251716 | | 9/2005 |
| WO | WO-02/41419 A1 | | 5/2002 |

OTHER PUBLICATIONS

Japanese Office Action issued in the copending U.S. Appl. No. 11/637,068 (Japanese Patent Application No. 2006-337877, mailed Jan. 31, 2013.
Japanese Office Action issued in Japanese Patent Application No. 2006-337877 dated May 10, 2012.

* cited by examiner

*Primary Examiner* — Laura Weiner
(74) *Attorney, Agent, or Firm* — McDermott Will & Emery LLP (57) ABSTRACT

The positive electrode of the lithium ion secondary battery includes active material particles containing a lithium composite oxide represented by:

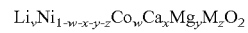

$Li_vNi_{1-w-x-y-z}Co_wCa_xMg_yM_zO_2$ ($0.85 \leq v \leq 1.25$, $0 < w \leq 0.75$, $0 < x \leq 0.1$, $0 < y \leq 0.1$, $0 \leq z \leq 0.75$, $0 < w+x+y+z \leq 0.80$, and element M is an element other than Co, Ca, and Mg), and (i) when $0 < z$, element M includes element Me of at least one selected from the group consisting of Mn, Al, B, W, Nb, Ta, In, Mo, Sn, Ti, Zr, and Y; and element Mc of at least one selected from the group consisting of Ca, Mg, and element Me is distributed more in the surface layer portion compared with the inner portion of the active material particles, and (ii) when $0=z$, element Mc of at least one selected from the group consisting of Ca and Mg is distributed more in the surface layer portion compared with the inner portion of the active material particles.

6 Claims, 1 Drawing Sheet

LITHIUM ION SECONDARY BATTERY

RELATED APPLICATIONS

This application is the U.S. National Phase under 35 U.S.C. §371 of International Application No. PCT/JP2006/311709, filed on Jun. 12, 2006, which in turn claims the benefit of Japanese Application No. 2005-176514, filed on Jun. 16, 2005, the disclosures of which Applications are incorporated by reference herein.

TECHNICAL FIELD

The present invention relates to a lithium ion secondary battery having excellent lifetime performance.

BACKGROUND ART

Non-aqueous electrolyte secondary batteries, which are typically represented by lithium ion secondary batteries, have a high electromotive force and a high energy density, and therefore a demand is increasing for lithium ion secondary batteries as a main power source for mobile telecommunication devices and portable electronic devices. Majority of the lithium ion secondary batteries currently on the market use a lithium composite oxide mainly composed of cobalt as the positive electrode active material (for example, $Li_xCoO_2$ (x changes by charging and discharging of the battery)). However, in the case of the lithium composite oxide mainly composed of cobalt, because the cost of the cobalt compound used as the raw material is high, cost reduction is difficult.

In view of cost reduction, research and development have been carried out for various positive electrode active materials that can be a substitute for lithium cobalt oxide. Particularly, vigorous researches have been carried out for a lithium composite oxide composed mainly of nickel (for example, $Li_xNiO_2$ (x changes by charging and discharging of the battery)).

In addition to the cost reduction, it is important to increase reliability of the lithium ion secondary battery. Upon charging, lithium composite oxides such as $Li_xCoO_2$ and $Li_xNiO_2$ contain $Co^{4+}$ and $Ni^{4+}$ that are highly reactive and high in valence. Due to this fact, under a high-temperature environment, the electrolyte decomposition reaction involving the lithium composite oxide is accelerated to generate gas in the battery, declining lifetime performance. Regarding the reactivity with the electrolyte under charged state, it is known that $Li_xNiO_2$ is highly reactive with the electrolyte more than $Li_xCoO_2$. Also, in lithium composite oxides such as $Li_xCoO_2$ and $Li_xNiO_2$, when oxidation numbers of Co and Ni are high, their crystal structures are unstable. Therefore, upon repeating charge and discharge cycle, their crystal structures are gradually broken, failing to achieve sufficient cycle performance, and declining lifetime performance.

To curb the decomposition reaction of the electrolyte, there has been proposed that a coating film comprising a specific metal oxide is formed on the positive electrode active material surface (Patent Documents 1 to 5). Also, there has been proposed that by incorporating a different element in the lithium composite oxide to form a solid solution to stabilize the crystal structure of the lithium composite oxide, cycle performance and storage characteristics under high temperature are improved (Patent Documents 6 to 8).

[Patent Document 1] Publication of Japanese Patent No. 3543437

[Patent Document 2] Japanese Laid-Open Patent Publication No. Hei 11-317230

[Patent Document 3] Japanese Laid-Open Patent Publication No. Hei 11-16566

[Patent Document 4] Japanese Laid-Open Patent Publication No. 2001-196063

[Patent Document 5] Japanese Laid-Open Patent Publication No. 2003-173775

[Patent Document 6] Japanese Laid-Open Patent Publication No. 2004-111076

[Patent Document 7] Japanese Laid-Open Patent Publication No. Hei 11-40154

[Patent Document 8] Japanese Laid-Open Patent Publication No. 2002-15740

DISCLOSURE OF THE INVENTION

Problem to be Solved by the Invention

As described above, although there have been many proposals for curbing gas generation and improving cycle performance and storage characteristics under high temperature, there is still room for improvement for such techniques, such as below.

Many of lithium ion secondary batteries are used for various portable devices. Various portable devices are not always used immediately after the battery is charged. In many cases, batteries are kept under a charged state, and discharged afterwards. However, in reality, cycle life characteristics of batteries are generally evaluated under conditions different from such actual usage conditions.

For example, a general cycle life test is carried out under conditions with a short rest (pause) time after charging (for example, a rest time of 30 minutes). In the case when evaluations are carried out under such conditions, with the conventionally proposed techniques mentioned above, a certain degree of improvement can be achieved in cycle life characteristics.

However, it is different when intermittent cycles (charge and discharge cycles in which the rest time after charging is set to a long period of time) are repeated by assuming actual usage conditions. For example, by carrying out a cycle life test with a rest time of 720 minutes, there may be a case where sufficient lifetime performance cannot be obtained by any of the above techniques. That is, in conventional lithium ion secondary batteries, there is still a room for improvement in intermittent cycle performance.

Means for Solving the Problem

In view of the above, the present invention aims to improve intermittent cycle performance of a lithium ion secondary battery including a lithium composite oxide composed mainly of nickel as the positive electrode active material.

That is, the present invention relates to a lithium ion secondary battery including:
- a positive electrode capable of charging and discharging;
- a negative electrode capable of charging and discharging; and
- a non-aqueous electrolyte;
- the positive electrode including active material particles,
- the active material particles including a lithium composite oxide, and
- the lithium composite oxide being represented by:

$Li_vNi_{1-w-x-y-z}Co_wCa_xMg_yM_zO_2$ where $0.85 \leq v \leq 1.25$, $0 < w \leq 0.75$, $0 < x \leq 0.1$, $0 < y \leq 0.1$, $0 \leq z \leq 0.5$, $0 < w+x+y+z \leq 0.80$, and element M is at least one element selected from the group consisting of an alkaline earth element, a transition element, a rare-earth element, a group III-b element, and a group IV-b element, but excluding Co, Ca, and Mg, wherein (i) when 0<z, element M includes at least element Me of at least one selected from the group consisting of Mn, Al, B, W, Nb, Ta, In, Mo, Sn, Ti, Zr, and Y, and element Mc of at least one selected from the group consisting of Ca, Mg, and element Me is distributed more in the surface layer portion compared with the inner portion of the active material particles; and (ii) when 0=z, element Mc of at least one selected from the group consisting of Ca and Mg is distributed more in the surface layer portion compared with the inner portion of the active material particles.

The average particle size of the active material particles is preferably 10 μm or more.

The lithium composite oxide is a solid solution having a crystal structure of $Li_vNiO_2$; containing Co, Ca, and Mg as essential components; and containing element M as an arbitrary component. That is, in the crystal structure of $Li_vNiO_2$, a portion of Ni site is replaced with Co, Ca, and Mg, and when the solid solution includes element M, further replaced with element M.

The present invention includes an embodiment in which the surface layer portion of the active material particles contains element Md forming a crystal structure different from the lithium composite oxide and element Md is the same element as element Mc. At the surface layer portion of the active material particles, element Md preferably forms an oxide having a crystal structure different from the lithium composite oxide. The amount of element Md is preferably 2 mol % or less relative to the lithium composite oxide.

The non-aqueous electrolyte preferably contains at least one selected from the group consisting of vinylene carbonate, vinylethylene carbonate, phosphazene, and fluorobenzene.

Effects of the Invention

Based on the present invention, in a lithium ion secondary battery including a lithium composite oxide composed mainly of nickel as the positive electrode active material, intermittent cycle performance can be improved more than conventionally achieved.

At this point, reasons are only known phenomenologically for the drastic improvement in intermittent cycle performance by incorporating at least Co, Ca, and Mg into the lithium composite oxide composed mainly of nickel to form a solid solution, and then further by distributing element Mc more in the surface layer portion compared with the inner portion of the active material particles.

However, by just incorporating Co, Ca, and Mg into the lithium composite oxide composed mainly of nickel, intermittent cycle performance barely improves. Also, by just distributing element Mc more in the surface layer portion compared with the inner portion of the active material particles, intermittent cycle performance barely improves. On the other hand, various experiments confirmed that by combining these techniques, intermittent cycle performance drastically improves.

It was also found that intermittent cycle performance barely improves by incorporating only Co, only Mg, only Ca, only Co and Ca, only Co and Mg, or only Ca and Mg into the lithium composite oxide composed mainly of nickel to form a solid solution. Further, it was also found that intermittent cycle performance barely improves even by distributing an element other than element Mc more in the surface layer portion compared with the inner portion of the active material particles.

In a typical embodiment of the present invention, the surface layer portion of the active material particles includes element Md forming a crystal structure different from the lithium composite oxide, and element Md is the same element as element Mc. From various causes, element Mc (that is, the element forming the crystal structure of the lithium composite oxide) that is present more in the surface layer portion of the active material particles sometimes changes into element Md (that is, the element forming a crystal structure different from the lithium composite oxide). Also, element Md that is present in the surface layer portion of the active material particles diffuses into the lithium composite oxide to change into element Mc. However, element Mc incorporated in the lithium composite oxide to form a solid solution, and element Md forming a crystal structure different from the lithium composite oxide can be distinguished by various analyzing methods.

At this point, it is difficult to clearly analyze how element Md is contained in the surface layer portion of the active material particles. However, it can be confirmed by using various analyzing methods that element Md is present as an oxide having a different crystal structure from the lithium composite oxide or as a lithium-containing oxide. For the analyzing method, element mapping by EPMA (Electron Probe Micro-Analysis), analysis on chemical bond by XPS (X-ray Photoelectron Spectroscopy), and surface composition analysis by SIMS (Secondary Ionization Mass Spectroscopy) may be mentioned.

BEST MODE FOR CARRYING OUT THE INVENTION

A positive electrode in accordance with the present invention is described. The positive electrode contains the following active material particles.

The active material particles contain a lithium composite oxide composed mainly of nickel. Although the form of the lithium composite oxide is not particularly limited, for example, the active material particles may be formed of primary particles, or the active material particles may be formed of secondary particles. A plurality of active material particles may be coagulated to form secondary particles. The average particle size of the active material particles is not particularly limited, but for example, preferably 1 to 30 μm, and particularly preferably 10 to 30 μm. The average particle size may be determined by, for example, a wet laser particle size distribution analyzer manufactured by Microtrac, Inc. The 50% value of the volume-based particle size distribution (Median Value: $D_{50}$) can be regarded as the average particle size of the active material particles.

The lithium composite oxide is represented by the general formula:

where $0.85 \le v \le 1.25$, $0 < w \le 0.75$, $0 < x \le 0.1$, $0 < y \le 0.1$, $0 \le z \le 0.5$, $0 < w+x+y+z \le 0.80$, and element M is an element of at least one selected from the group consisting of an alkaline earth element, a transition element, a rare-earth element, a group IIIb element, and a group IVb element, but excluding Co, Ca, and Mg.

When $0<z$, the lithium composite oxide contains at least element Me of at least one selected from the group consisting of Mn, Al, B, W, Nb, Ta, In, Mo, Sn, Ti, Zr, and Y as element M. Element Me may be one of Mn, Al, B, W, Nb, Ta, In, Mo, Sn, Ti, Zr, and Y, or two or more of these. Element Me is an element actually contained in the lithium composite oxide. When $0<z$, Mn, Al, B, W, Nb, Ta, In, Mo, Sn, Ti, Zr, and Y listed as element M are the candidates for the essential element of the lithium composite oxide. When $0<z$, element Mc of at least one selected from the group consisting of Ca, Mg, and element Me is distributed more in the surface layer portion than in the inner portion of the active material particles.

When $0=z$, the lithium composite oxide is represented by the general formula:

$$Li_vNi_{1-w-x-y-z}Co_wCa_xMg_yO_2$$

(where $0.85 \leq v \leq 1.25$, $0<w \leq 0.75$, $0<x \leq 0.1$, $0<y \leq 0.1$, and $0<w+x+y \leq 0.80$). In this case, element Mc of at least one selected from the group consisting of Ca and Mg is distributed more in the surface layer portion than in the inner portion of the active material particles.

The range of v that shows the Li content increases and decreases by battery charge and discharge. The range of x under completely discharged state or initial state (immediately after synthesizing the lithium composite oxide) may be $0.85 \leq v \leq 1.25$, but preferably $0.93 \leq v \leq 1.1$. Co is an essential component, and gives effects of decreasing the irreversible capacity to the lithium composite oxide. Ca and Mg are also essential components, and give effects of improving thermal stability to the lithium composite oxide. Element Me gives effects of improving thermal stability to the lithium composite oxide. Element Me further gives effects of improving intermittent cycle performance to the lithium composite oxide by being distributed more in the surface layer portion of the active material particles. These effects are brought out also when Ca and Mg are distributed more in the surface layer portion of the active material particles.

The range of w that shows the Co content may be $0<w \leq 0.75$. However, for obtaining sufficient effects of decreasing irreversible capacity, it is preferably $0.05 \leq w \leq 0.25$, and further preferably $0.08 \leq w \leq 0.20$. When $0.75<w$, the Co amount becomes excessive, eliminating the merits of cost reduction. It also becomes difficult to achieve the high capacity particular to the active material composed mainly of Ni.

The range of x that shows the Ca content may be $0<x \leq 0.1$. However, for giving sufficient effects of improving thermal stability to the lithium composite oxide, and further giving effects of improving intermittent cycle performance to the lithium composite oxide, it is preferably $0.00002 \leq x \leq 0.1$, and further preferably $0.0001 \leq x \leq 0.05$ or $0.001 \leq x \leq 0.005$. When $0.1<x$, the Ca amount becomes excessive, and it becomes difficult to achieve the high capacity particular to the active material composed mainly of Ni.

The range of y that shows the Mg content may be $0<y \leq 0.1$. However, for giving sufficient effects of improving thermal stability to the lithium composite oxide, and further giving effects of improving intermittent cycle performance to the lithium composite oxide, it is preferably $0.00002 \leq y \leq 0.1$, and further preferably $0.0001 \leq y \leq 0.05$ or $0.001 \leq x \leq 0.005$. When $0.1<y$, the Mg amount becomes excessive, and it becomes difficult to achieve the high capacity particular to the active material composed mainly of Ni.

The lithium composite oxide contains Mg and Ca as essential elements at the same time. Although reasons are not clear, presumably, by allowing Mg and Ca to coexist, the effects of improving crystal stability of the lithium composite oxide can be heightened, and intermittent cycle performance is improved. Since the ionic radiuses of Mg and Ca are close to the ionic radius of Ni, Ni in the lithium composite oxide is easily replaced with them.

The range of z that shows the element M content may be $0 \leq z \leq 0.5$. However, for giving effects of improving intermittent cycle performance to the lithium composite oxide, it is preferably $0.0001 \leq z \leq 0.4$, and further preferably $0.001 \leq z \leq 0.35$. When $0.5<z$, the amount of element M becomes excessive, and it becomes difficult to achieve the high capacity particular to the active material composed mainly of Ni.

As to the metal element content other than Li and Ni in the lithium composite oxide, it is sufficient when $0<w+x+y+z \leq 0.80$ is satisfied. However, it is preferably $0.05 \leq w+x+y+z \leq 0.5$, and further preferably $0.1 \leq w+x+y+z \leq 0.35$. When $0.8<w+x+y+z$, the proportion of Ni in the metals other than Li becomes below 20 atom %, and a desired capacity cannot be obtained.

The lithium composite oxide represented by the above general formula can be synthesized by baking the raw materials with a predetermined metal element ratio in an oxidizing atmosphere. The raw materials include lithium, nickel, cobalt, calcium, magnesium, and element M as an arbitrary component. The raw materials include oxides, hydroxides, oxyhydroxides, carbonates, nitrates, and organic complex salts of each metal element. These may be used singly, or may be used in combination of two or more.

For easily synthesizing the lithium composite oxide, the raw material preferably includes a solid solution containing a plurality of metal elements. The solid solution containing a plurality of metal elements may be formed as any of oxides, hydroxides, oxyhydroxides, carbonates, nitrates, and organic complex salts. For example, a solid solution including Ni and Co, a solid solution including Ni and element M, a solid solution including Co and element M, and a solid solution including Ni, Co, and element M may be used.

The baking temperature of the raw material and the partial pressure of oxygen in the oxidizing atmosphere depend on the composition, amount, and synthesizing device of the raw material, but those skilled in the art may appropriately select suitable conditions.

The present invention includes an embodiment in which element Md having a different crystal structure from the lithium composite oxide is included in the surface layer portion of the active material particles and element Md is the same element as element Mc. Element Md is the same kind as element Mc that is distributed more in the surface layer portion of the active material particles, but element Md is not necessarily incorporated in the lithium composite oxide to form a solid solution. Element Md mainly forms an oxide having a different crystal structure from the lithium composite oxide in the surface layer portion of the active material particles. On the other hand, element Mc contained in the lithium composite oxide is incorporated in the crystal structure of $Li_vNiO_2$, forming a solid solution.

Element Md is in the state of oxides or lithium-containing oxides, and preferably deposited on, attached to, or carried on the lithium composite oxide surface. Element Mc incorporated into the lithium composite oxide to form a solid solution, and element Md forming a crystal structure different from the lithium composite oxide may be distinguished by various analyzing methods such as EPMA, XPS, and SIMS.

At the surface layer portion of the active material particles, element Mc forming the crystal structure of the lithium composite oxide, and element Md forming a crystal structure different from the lithium composite oxide coexist. Such a state can be achieved, for example, by synthesizing a lithium composite oxide, adding a raw material of an element of at least one selected from the group consisting of Ca, Mg, Mn, Al, B, W, Nb, Ta, In, Mo, Sn, Ti, Zr, and Y to the lithium-containing composite oxide, and further by baking them. A portion of the element added in the latter step is converted into element Md forming a crystal structure different from the lithium composite oxide, but the remaining is converted into element Mc incorporated into the lithium composite oxide to form a solid solution. Based on such a method, the concentration of element Mc becomes inevitably higher in the surface layer portion compared with the inner portion of the active material particles. The element added in the latter step may be entirely converted into element Mc incorporated into the lithium composite oxide to form a solid solution.

For the raw material of the element added in the latter step, sulfates, nitrates, carbonates, chlorides, hydroxides, oxides, and alkoxides are preferably used. These may be used singly, or may be used in combination of two or more. Among these, in view of battery performance, using sulfates, nitrates, chlorides, or alkoxides is particularly preferable.

The amount of element Md included in the active material particles is preferably 2 mol % or less, and further preferably 0.1 mol % or more and 1.5 mol % or less relative to the lithium composite oxide. When the amount of element Md exceeds 2.0 mol %, there may be a case where the active material particle surface is largely covered with the oxide not contributing to the reaction. Therefore, for keeping excellent battery reaction, the amount of element Md is preferably 2 mol % or less relative to the lithium composite oxide.

Next, an example of making a positive electrode (where 0<z) is described.

(i) First Step

A lithium composite oxide represented by the general formula:

$Li_vNi_{1-w-x-y-z}Co_wCa_xMg_yM_zO_2$ (where $0.85 \leq v \leq 1.25$, $0 < w \leq 0.75$, $0 < x \leq 0.1$, $0 < y \leq 0.1$, $0 \leq z \leq 0.5$, $0 < w+x+y+z \leq 0.78$, and element M is at least one selected from the group consisting of Mn, Al, B, W, Nb, Ta, In, Mo, Sn, Ti, Zr, and Y) is prepared. The preparation method of the lithium composite oxide is not particularly limited. For example, a raw material having a predetermined metal element ratio is baked in an oxidizing atmosphere, to synthesize a lithium composite oxide. The baking temperature and the partial pressure of oxygen in the oxidizing atmosphere are appropriately selected according to the composition, amount, and the synthesizing device of the raw material.

(ii) Second Step

On the prepared lithium composite oxide, a raw material of an element to be converted into element Mc or Md (surface coating element) is allowed to be carried. At that time, although the average particle size of the lithium composite oxide is not particularly limited, for example, it is preferably 1 to 30 μm. The raw material of the surface coating element contains an element of at least one selected from the group consisting of Ca, Mg, Mn, Al, B, W, Nb, Ta, In, Mo, Sn, Ti, Zr, and Y.

For the raw material of the surface coating element, sulfates, nitrates, carbonates, chlorides, hydroxides, oxides, and alkoxides are used. The method for allowing the raw material of the surface coating element to be carried on the lithium composite oxide is not particularly limited. For example, preferably, the raw material of the surface coating element is dissolved or dispersed in a liquid component to prepare a solution or a dispersion, and after mixing this solution or a dispersion with the lithium composite oxide, the liquid component is removed.

The liquid component in which the raw material of the surface coating element is dissolved or dispersed is not particularly limited, but ketones such as acetone and methylethylketone (MEK); ethers such as tetrahydrofuran (THF); alcohols such as ethanol; and other organic solvents are preferable. Alkaline water with pH10 to 14 is also preferably used.

Upon mixing in the lithium composite oxide to the obtained solution or dispersion and stirring, the temperature of the liquid is not particularly limited. However, in view of workability and manufacturing costs, it is preferably controlled to 20 to 40° C. The stirring time is not particularly limited, but for example, 3 hours of stirring is sufficient. The method for removing the liquid component is not particularly limited as well, but for example, drying at about a temperature of 100° C. for 2 hours is sufficient.

(iii) Third Step

A lithium composite oxide allowed to carry a surface coating element on the surface thereof is baked at 650 to 750° C. for 2 to 24 hours, preferably for about 6 hours, under an oxygen atmosphere. The pressure of the oxygen atmosphere is preferably 101 to 50 KPa. By this baking, the surface coating element is converted to element Mc incorporated in the lithium composite oxide to form a solid solution, or element Md forming a crystal structure different from the lithium composite oxide.

(iv) Fourth Step

A positive electrode is made by using the active material particles. The method for making the positive electrode is not particularly limited. Generally, a positive electrode in which a positive electrode material mixture including active material particles and a binder being carried on a strip positive electrode core material (positive electrode current collector) is made. To the positive electrode material mixture, an additive such as a conductive material can be also added as an arbitrary component. The positive electrode material mixture is dispersed in a liquid component to prepare a paste, and the paste is applied on the core material and then dried, thereby allowing the positive electrode material mixture to be carried on the core material.

For the binder to be included in the positive electrode material mixture, any of a thermoplastic resin and a thermosetting resin may be used, but the thermoplastic resin is preferable. Such thermoplastic resins include, for example, polyethylene, polypropylene, polytetrafluoroethylene (PTFE), polyvinylidene fluoride (PVDF), styrenebutadiene rubber, a tetrafluoroethylene-hexafluoropropylene copolymer (FEP), a tetrafluoroethylene-perfluoroalkylvinylether copolymer (PFA), a vinylidene fluoride-hexafluoropropylene copolymer, a vinylidene fluoride-chlorotrifluoroethylene copolymer, an ethylene-tetrafluoroethylene copolymer (ETFE), polychlorotrifluoroethylene (PCTFE), a vinylidene fluoride-pentafluoropropylene copolymer, a propylene-tetrafluoroethylene copolymer, an ethylene-chlorotrifluoroethylene copolymer (ECTFE), a vinylidene fluoride-hexafluoropropylene-tetrafluoroethylene copolymer, a vinylidene fluoride-perfluoromethylvinylether-tetrafluoroethylene copolymer, an ethylene-acrylic acid copolymer, an ethylene-methacrylic acid copolymer, an ethylene-methyl acrylate copolymer, and an ethylene-methyl methacrylate copolymer. These may be used singly, or may be used in combination of two or more. These may be crosslinked by Na-ions.

The conductive material to be included in the positive electrode material mixture may be any electron conductive material that is chemically stable in the battery. For example, graphites such as natural graphite (such as flake graphite) and artificial graphite; carbon blacks such as acetylene black, ketjen black, channel black, furnace black, lamp black, and thermal black; conductive fibers such as carbon fiber and metal fiber; metal powders such as aluminum; conductive whiskers such as zinc oxide and potassium titanate; conductive metal oxides such as titanium oxide; organic conductive materials such as polyphenylene derivative; and carbon fluorides may be used. These may be used singly, or may be used in combination of two or more. The amount of the conductive material to be added is not particularly limited, but preferably 1 to 50 wt %, further preferably 1 to 30 wt %, and particularly preferably 2 to 15 wt % relative to the active material particles included in the positive electrode material mixture.

Any electronic conductor may be used for the positive electrode core material (positive electrode current collector), as long as it is chemically stable in the battery. For example, foil or sheet of aluminum, stainless steel, nickel, titanium, carbon, or conductive resin may be used. Particularly, aluminum foil and aluminum alloy foil are preferable. On the foil or sheet surface, a carbon or titanium layer may be given, and an oxide layer may be formed as well. The foil or sheet surface may be made uneven. A net, a punched sheet, a lath material, a porous material, a formed material, and a fibrous molded material may also be used. The thickness of the positive electrode core material is not particularly limited, but for example, in the range of 1 to 500 μm.

Next, elements other than the positive electrode of the lithium ion secondary battery of the present invention are described. However, the lithium ion secondary battery of the present invention is characterized by inclusion of the positive electrode mentioned above, and other elements are not particularly limited. Therefore, the following description does not limit the present invention.

May be used as the negative electrode capable of charging and discharging lithium, for example, is a negative electrode material mixture containing a negative electrode active material and a binder, and arbitrary components such as a conductive material and a thickener; and being carried on a negative electrode core material. Such a negative electrode may be made in the same manner as the positive electrode.

Any material capable of electrochemically charging and discharging lithium may be used as the negative electrode active material. For example, graphites; non-graphitizable carbon materials; lithium alloys; and metal oxides may be used. The lithium alloy is preferably an alloy including at least one selected from the group consisting of silicon, tin, aluminum, zinc, and magnesium. For the metal oxide, an oxide containing silicon and an oxide containing tin are preferable, and those are further preferably hybridized with a carbon material. The average particle size of the negative electrode active material is not particularly limited, but preferably 1 to 30 μm.

For the binder to be included in the negative electrode material mixture, any of a thermoplastic resin and a thermosetting resin may be used, but the thermoplastic resin is preferable. Such a thermoplastic resin includes, for example, polyethylene, polypropylene, polytetrafluoroethylene (PTFE), polyvinylidene fluoride (PVDF), styrenebutadiene rubber, a tetrafluoroethylene-hexafluoropropylene copolymer (FEP), a tetrafluoroethylene-perfluoroalkylvinylether copolymer (PFA), a vinylidene fluoride-hexafluoropropylene copolymer, a vinylidene fluoride-chlorotrifluoroethylene copolymer, an ethylene-tetrafluoroethylene copolymer (ETFE), polychlorotrifluoroethylene (PCTFE), a vinylidene fluoride-pentafluoropropylene copolymer, a propylene-tetrafluoroethylene copolymer, an ethylene-chlorotrifluoroethylene copolymer (ECTFE), a vinylidene fluoride-hexafluoropropylene-tetrafluoroethylene copolymer, a vinylidene fluoride-perfluoromethylvinylether-tetrafluoroethylene copolymer, an ethylene-acrylic acid copolymer, an ethylene-methacrylic acid copolymer, an ethylene-methyl acrylate copolymer, and an ethylene-methyl methacrylate copolymer. These may be used singly, or may be used in combination of two or more. These may be crosslinked by Na-ions.

The conductive material to be included in the negative electrode material mixture may be any electron conductive material, as long as it is chemically stable in the battery. For example, graphites such as natural graphite (such as flake graphite) and artificial graphite; carbon blacks such as acetylene black, ketjen black, channel black, furnace black, lamp black, and thermal black; conductive fibers such as carbon fiber and metal fiber; metal powders such as copper and nickel; and organic conductive materials such as polyphenylene derivative may be used. These may be used singly, or may be used in combination of two or more. The amount of the conductive material to be added is not particularly limited, but preferably 1 to 30 wt %, and further preferably 1 to 10 wt % relative to the active material particles to be included in the negative electrode material mixture.

The negative electrode core material (negative electrode current collector) may be any electronic conductor, as long as it is chemically stable in the battery. For example, foil or sheet of stainless steel, nickel, copper, titanium, carbon, or conductive resin may be used. Particularly, copper and a copper alloy are preferable. On the foil or sheet surface, a layer of carbon, titanium, or nickel may be given, and an oxide layer may be formed as well. The foil or sheet surface may be made uneven. A net, a punched sheet, a lath material, a porous material, a formed material, and a fibrous molded material may also be used. The thickness of the negative electrode core material is not particularly limited, but for example, in the range of 1 to 500 μm.

For the non-aqueous electrolyte, a non-aqueous solvent dissolving a lithium salt therein is preferably used.

For the non-aqueous solvent, for example, cyclic carbonates such as ethylene carbonate (EC), propylene carbonate (PC), and butylene carbonate (BC); chain carbonates such as dimethyl carbonate (DMC), diethyl carbonate (DEC), ethyl methyl carbonate (EMC), and dipropyl carbonate (DPC); aliphatic carboxylic acid esters such as methyl formate, methyl acetate, methyl propionate, and ethyl propionate; lactones such as γ-butyrolactone and γ-valerolactone; chain ethers such as 1,2-dimethoxyethane (DME), 1,2-diethoxyethane (DEE), and ethoxymethoxyethane (EME); cyclic ethers such as tetrahydrofuran and 2-methyltetrahydrofuran; dimethylsulfoxide; 1,3-dioxolane; formamide; acetamide; dimethylformamide; dioxolane; acetonitrile; propylnitrile; nitromethane; ethyl monoglyme; phosphoric acid triester; trimethoxymethane; dioxolane derivatives; sulfolane; methyl sulfolane; 1,3-dimethyl-2-imidazolidinone; 3-methyl-2-oxazolidinone; propylene carbonate derivatives; tetrahydrofuran derivatives; ethylether; 1,3-propane sulfone; anisole; dimethylsulfoxide; and N-methyl-2-pyrrolidone may be used. These may be used singly, but preferably used in combination of two or more. Particularly, a solvent mixture of cyclic carbonate and chain carbonate, or a solvent mixture of cyclic carbonate, chain carbonate, and aliphatic carboxylic acid ester is preferable.

For the lithium salt to be dissolved in the non-aqueous solvent, for example, $LiClO_4$, $LiBF_4$, $LiPF_6$, $LiAlCl_4$, LiSbF$_6$, LiSCN, LiCl, LiCF$_3$SO$_3$, LiCF$_3$CO$_2$, Li(CF$_3$SO$_2$)$_2$, LiAsF$_6$, LiN(CF$_3$SO$_2$)$_2$, LiB$_{10}$Cl$_{10}$, lithium lower aliphatic carboxylate, LiCl, LiBr, LiI, chloroborane lithium, lithium tetraphenylborate, and lithium imide salt may be mentioned. These may be used singly, or may be used in combination of two or more, but at least LiPF$_6$ is preferably used. The amount of the lithium salt to be dissolved relative to the non-aqueous solvent is not particularly limited. However, the lithium salt concentration is preferably 0.2 to 2 mol/L, and further preferably 0.5 to 1.5 mol/L.

To the non-aqueous electrolyte, for the purpose of improving battery charge and discharge performance, various additives may be added. For the additive, for example, at least one selected from the group consisting of vinylene carbonate, vinylethylene carbonate, phosphazene, and fluorobenzene is used. The appropriate amount of these additives contained is 0.5 to 20 wt % relative to the non-aqueous electrolyte.

Other various additives, for example, triethyl phosphite, triethanol amine, cyclic ether, ethylenediamine, n-glyme, pyridine, triamide hexaphosphate, nitrobenzene derivatives, crown ethers, quaternary ammonium salts, and ethylene glycol dialkylether may also be used.

A separator needs to be interposed between the positive electrode and the negative electrode.

Preferably used for the separator is a microporous thin film having a high ion-permeability, a predetermined mechanical strength, and electrical insulation. The microporous thin film preferably functions to close the pores at a predetermined temperature or more, to increase resistance. For the microporous thin film material, preferably used are polyolefins such as polypropylene and polyethylene excellent in resistance to organic solvents and having hydrophobicity. A sheet made of glass fiber, and nonwoven fabric or woven fabric are also used. The pore size of the separator is, for example, 0.01 to 1 μm. The thickness of the separator is generally 10 to 300 μm. The porosity of the separator is generally 30 to 80%.

A polymer electrolyte including a non-aqueous liquid electrolyte and a polymer material retaining the non-aqueous liquid electrolyte may be used as a separator by being integrated with the positive electrode or the negative electrode. Any polymer material may be used, as long as it can retain the non-aqueous liquid electrolyte, but particularly, a copolymer of vinylidene fluoride and hexafluoropropylene is preferable.

The present invention is described in detail based on Examples in the following, but the present invention is not limited to Examples below.

EXAMPLE 1

Example Battery A1

(1) Synthesizing Lithium Composite Oxide

Nickel sulfate, cobalt sulfate, and aluminum sulfate were mixed so that the molar ratio between Ni atoms, Co atoms, and Al atoms was 80:15:4.96. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of the obtained Ni—Co—Al coprecipitated hydroxide, 784 g of lithium hydroxide, 0.49 g of calcium hydroxide, and 0.38 g of magnesium hydroxide were mixed, and the mixture was baked under a partial pressure of oxygen of 0.5 atmosphere, with a synthesizing temperature of 750° C. for 10 hours. As a result, a lithium composite oxide of Ni—Co—Mg—Ca—Al including Al as element Me(LiNi$_{0.8}$Co$_{0.15}$Ca$_{0.0002}$Mg$_{0.0002}$Al$_{0.0496}$O$_2$) and having the average particle size of 12 μm was obtained.

(2) Synthesizing Active Material Particles

<i> First Step To a solution in which pentaethoxytantalum was dissolved in 10 L of ethanol, 2 kg of the synthesized lithium composite oxide was dispersed. The amount of pentaethoxytantalum dissolved was set to 0.5 mol % relative to the lithium composite oxide. The ethanol solution in which the lithium composite oxide was dispersed was stirred at 25° C. for 3 hours, and then filtrated. The solid content was dried at 100° C. for 2 hours. As a result, a lithium composite oxide carrying tantalum (Ta) as the surface coating element on the surface thereof was obtained.

<ii> Second Step

The dried powder was preliminary baked at 300° C. for 6 hours under a dry air atmosphere (humidity 19%, pressure 101 KPa).

Then, the main baking was carried out for the preliminary baked powder at 650° C. for 6 hours under an atmosphere of 100% oxygen (pressure 101 KPa).

Lastly, the powder after the main baking was annealed at 400° C. under an atmosphere of 100% oxygen (pressure 101 KPa) for 4 hours.

By this baking, active material particles including Ta (element Mc) incorporated in the lithium composite oxide to form a solid solution, and having a surface layer portion including Ta (element Md) forming an oxide having a different crystal structure from the lithium composite oxide were obtained.

The presence of Ta having a different crystal structure was confirmed by XPS, EMPA, or ICP emission spectroscopy. In the following Examples as well, similarly, the presence of element Md in the active material particles was confirmed by XPS, EMPA, or ICP emission analysis.

It was also confirmed that Ta (element Mc) incorporated in the lithium composite oxide to form a solid solution was distributed more in the surface layer portion compared with the inner portion of the active material particles, by an element map obtained by EPMA of an active material particle cross section.

(3) Positive Electrode Preparation

A positive electrode material mixture paste was prepared by stirring 1 kg of the obtained active material particles (with an average particle size of 12 μm) along with 0.5 kg of PVDF#1320 (a N-methyl-2-pyrrolidone (NMP) solution with a solid content of 12 wt %) manufactured by Kureha Corporation, 40 g of acetylene black, and an appropriate amount of NMP using a double-armed kneader. This paste was applied on both sides of an aluminum foil with a thickness of 20 μm, dried, and rolled to give a total thickness of 160 μm. The obtained electrode plate was slit to give a width that can be inserted in a battery case of cylindrical type 18650 to obtain a positive electrode.

(4) Negative Electrode Preparation

A negative electrode material mixture paste was prepared by stirring 3 kg of artificial graphite, 200 g of BM-400B (a dispersion of modified styrene-butadiene rubber with a solid content of 40 wt %) manufactured by Zeon Corporation, 50 g of carboxymethyl cellulose (CMC), and an appropriate amount of water using a double-armed kneader. This paste was applied on both sides of a copper foil with a thickness of 12 μm, dried, and rolled to give a total thickness of 160 μm. The obtained electrode plate was slit to give a width that can be inserted in a battery case of cylindrical type 18650 to obtain a negative electrode.

(5) Battery Assembly

Figure 1:
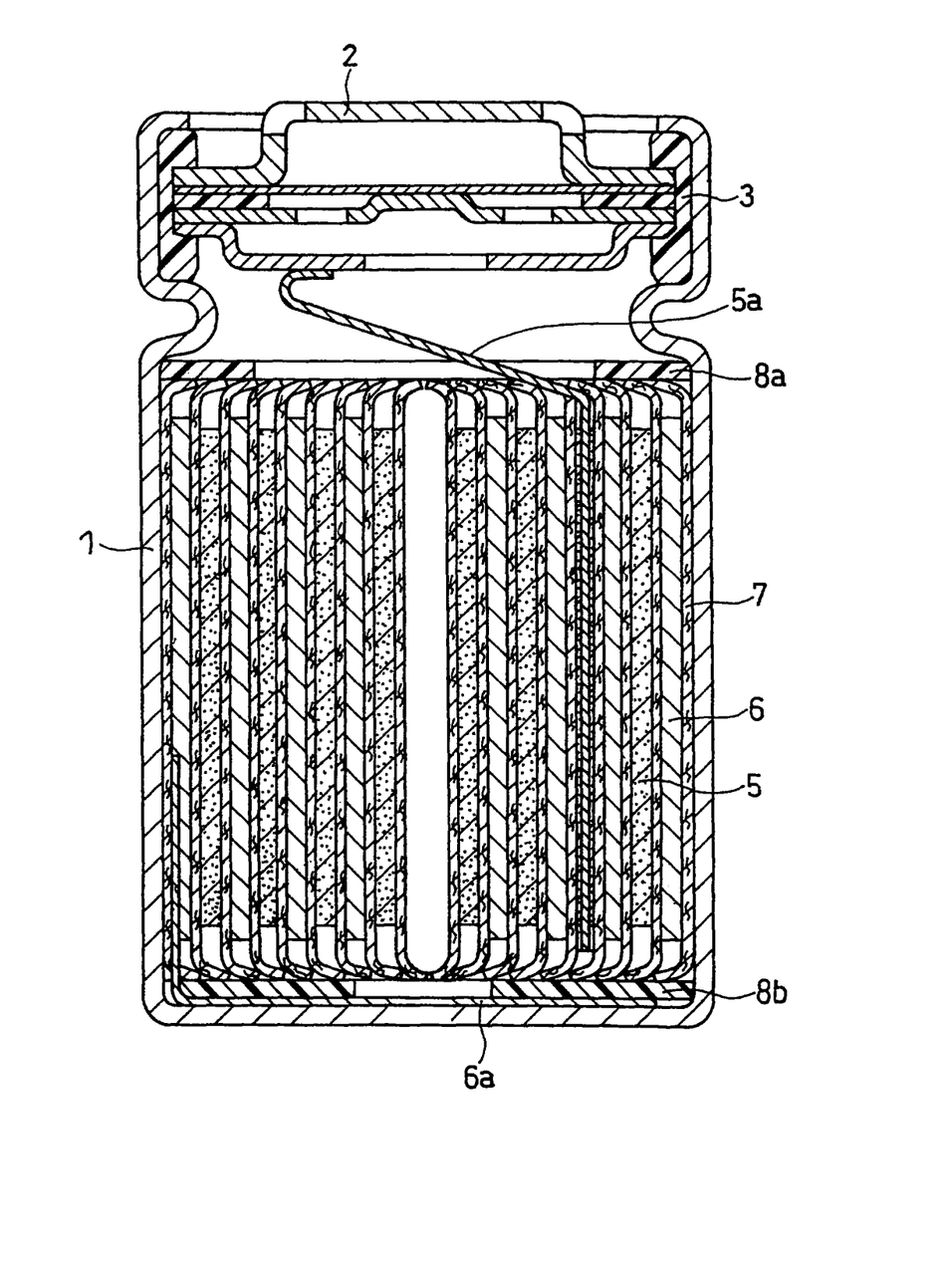
FIG. 1 A vertical cross section of a cylindrical lithium ion secondary battery of Example of the present invention.

As in FIG. 1, a positive electrode 5 and a negative electrode 6 were wound with a separator 7 interposed therebetween, to form a wound electrode assembly. For the separator 7, a composite film of polyethylene and polypropylene (2300 manufactured by Celgard Inc., a thickness of 25 μm) was used.

To the positive electrode 5 and the negative electrode 6, a positive electrode lead 5a and a negative electrode lead 6a of nickel were attached, respectively. An upper insulating plate 8a was disposed on the upper face of this electrode assembly, and a bottom insulating plate 8b was disposed on the bottom thereof; the electrode assembly was inserted in a battery case 1; and 5 g of a non-aqueous electrolyte was injected in the battery case 1.

The non-aqueous electrolyte was prepared by mixing ethylene carbonate and methyl ethyl carbonate in a volume ratio of 10:30; adding 2 wt % of vinylene carbonate, 2 wt % of vinylethylene carbonate, 5 wt % of fluorobenzene, and 5 wt % of phosphazene to the obtained solvent mixture; and further by dissolving $LiPF_6$ with a concentration of 1.5 mol/L.

A sealing plate 2 with an insulating gasket 3 disposed on the periphery thereof, and the positive electrode lead 5a were electrically connected, and the opening of the battery case 1 was sealed with the sealing plate 2. A cylindrical 18650 lithium secondary battery was thus completed. This was named as Example Battery A1.

Example Battery A2

Battery A2 was made in the same manner as battery A1, except that the amount of pentaethoxytantalum dissolved in 10 L of ethanol was changed to 2.0 mol % relative to the lithium composite oxide.

Example Battery A3

Battery A3 was made in the same manner as battery A1, except that in the first step of synthesizing the active material particles, a solution dissolving aluminum (Al) triisopropoxide in 10 L of isopropanol was used instead of the ethanol solution of pentaethoxytantalum. The amount of aluminum triisopropoxide was set to 0.5 mol % relative to the lithium composite oxide.

Example Battery A4

Battery A4 was made in the same manner as battery A3, except that the amount of aluminum triisopropoxide dissolved in 10 L of isopropanol was changed to 2.0 mol % relative to the lithium composite oxide.

Example Battery A5

Battery A5 was made in the same manner as battery A1, except that in the first step of synthesizing the active material particles, a solution dissolving zirconium (Zr) tetra-n-butoxide in 10 L of butanol was used instead of the ethanol solution of pentaethoxytantalum. The amount of zirconium tetra-n-butoxide was set to 0.5 mol % relative to the lithium composite oxide.

Example Battery A6

Battery A6 was made in the same manner as battery A5, except that the amount of zirconium tetra-n-butoxide dissolved in 10 L of butanol was changed to 2.0 mol % relative to the lithium composite oxide.

Example Battery A7

Battery A7 was made in the same manner as battery A1, except that in the first step of synthesizing the active material particles, a solution dissolving magnesium (Mg) acetate in 1 L of ethanol was used instead of the ethanol solution of pentaethoxytantalum. The amount of magnesium acetate was set to 0.5 mol % relative to the lithium composite oxide.

Example Battery A8

Battery A8 was made in the same manner as battery A7, except that the amount of magnesium acetate dissolved in 1 L of ethanol was changed to 2.0 mol % relative to the lithium composite oxide.

Example Battery A9

Battery A9 was made in the same manner as battery A1, except that in the first step of synthesizing the active material particles, a solution dissolving indium (In) nitrate in 1 L of ethanol was used instead of the ethanol solution of pentaethoxytantalum. The amount of indium nitrate was set to mol % relative to the lithium composite oxide.

Example Battery A10

Battery A10 was made in the same manner as battery A9, except that the amount of indium nitrate dissolved in 1 L of ethanol was changed to 2.0 mol % relative to the lithium composite oxide.

Example Battery A11

In the first step of synthesizing the active material particles, 2 kg of the lithium composite oxide was dispersed in 1 L of an aqueous solution of sodium hydroxide with pH13 instead of the ethanol solution of pentaethoxytantalum. To the obtained dispersion, an aqueous solution dissolving tin (Sn) sulfate in 100 g of distilled water was dropped in 10 minutes, and afterwards, the mixture was stirred at 100° C. for 3 hours. The amount of tin sulfate was set to 0.5 mol % relative to the lithium composite oxide. Except for the above, battery A11 was made in the same manner as battery A1.

Example Battery A12

Battery A12 was made in the same manner as battery A11, except that the amount of tin sulfate dissolved in 100 g of the distilled water was changed to 2.0 mol % relative to the lithium composite oxide.

Example Battery A13

Battery A13 was made in the same manner as battery A11, except that tin sulfate was changed to manganese (Mn) sulfate.

Example Battery A14

Battery A14 was made in the same manner as battery A12, except that tin sulfate was changed to manganese sulfate.

Example Battery A15

Battery A15 was made in the same manner as battery A11, except that tin sulfate was changed to boric (B) acid.

Example Battery A16

Battery A16 was made in the same manner as battery A12, except that tin sulfate was changed to boric acid.

Example Battery A17

Battery A17 was made in the same manner as battery A11, except that tin sulfate was changed to sodium tungstate (W).

Example Battery A18

Battery A18 was made in the same manner as battery A12, except that tin sulfate was changed to sodium tungstate.

Example Battery A19

Battery A19 was made in the same manner as battery A11, except that tin sulfate was changed to niobium (Nb) pentachloride.

Example Battery A20

Battery A20 was made in the same manner as battery A12, except that tin sulfate was changed to niobium pentachloride.

Example Battery A21

Battery A21 was made in the same manner as battery A11, except that tin sulfate was changed to disodium molybdate dihydrate.

Example Battery A22

Battery A22 was made in the same manner as battery A12, except that tin sulfate was changed to disodium molybdate dihydrate.

Example Batteries A23 to 33

Batteries A23 to A33 were made in the same manner as batteries 1A, 3A, 5A, 7A, 9A, 11A, 13A, 15A, 17A, 19A, and 21A, respectively, except that the amounts of pentaethoxytantalum, aluminum triisopropoxide, zirconium tetra-n-butoxide, magnesium acetate, indium nitrate, tin sulfate, manganese sulfate, boric acid, sodium tungstate, niobium pentachloride, and disodium molybdate dihydrate relative to the lithium composite oxide were set to 2.5 mol %.

[Evaluation 1]
(Discharge Performance)

Each battery was preliminary charged and discharged twice, and afterwards, stored at a 40° C. environment for 2 days. Then, the following two cycle patterns were repeated for each battery. The designed capacity of batteries was 1 CmAh.

First Pattern (Usual Cycle Test)
(1) Constant Current Charge (45° C.): 0.7 CmA (End Voltage 4.2 V)
(2) Constant Voltage Charge (45° C.): 4.2 V (End Current 0.05 CmA)
(3) Charge Rest (45° C.): 30 minutes
(4) Constant Current Discharge (45° C.): 1 CmA (End Voltage 3 V)
(5) Discharge Rest (45° C.): 30 minutes Second Pattern (Intermittent Cycle Test)
(1) Constant Current Charge (45° C.): 0.7 CmA (End Voltage 4.2 V)
(2) Constant Voltage Charge (45° C.): 4.2 V (End Current 0.05 CmA)
(3) Charge Rest (45° C.): 720 minutes
(4) Constant Current Discharge (45° C.): 1 CmA (End Voltage 3 V)
(5) Discharge Rest (45° C.): 720 minutes The discharge capacity obtained after 500 cycles of the first pattern and of the second pattern is shown in Table 1A.

TABLE 1A

Composite Oxide $LiNi_{0.8}Co_{0.15}Ca_{0.0002}Mg_{0.0002}Al_{0.0496}O_2$

| Battery No. | | Surface Coating Element | Amount Added (mol %) | Intermittent Cycle Performance Charge Rest 30 minutes at 45° C. (mAh) | 720 minutes at 45° C. (mAh) |
|---|---|---|---|---|---|
| Example | A1 | Ta | 0.5 | 2180 | 2100 |
| Example | A2 |  | 2.0 | 2185 | 2100 |
| Example | A3 | Al | 0.5 | 2185 | 2105 |
| Example | A4 |  | 2.0 | 2190 | 2105 |
| Example | A5 | Zr | 0.5 | 2190 | 2110 |
| Example | A6 |  | 2.0 | 2190 | 2110 |
| Example | A7 | Mg | 0.5 | 2195 | 2115 |
| Example | A8 |  | 2.0 | 2192 | 2120 |
| Example | A9 | In | 0.5 | 2190 | 2125 |
| Example | A10 |  | 2.0 | 2195 | 2120 |
| Example | A11 | Sn | 0.5 | 2190 | 2110 |
| Example | A12 |  | 2.0 | 2189 | 2105 |
| Example | A13 | Mn | 0.5 | 2190 | 2100 |
| Example | A14 |  | 2.0 | 2191 | 2100 |
| Example | A15 | B | 0.5 | 2191 | 2100 |
| Example | A16 |  | 2.0 | 2190 | 2105 |
| Example | A17 | W | 0.5 | 2190 | 2102 |
| Example | A18 |  | 2.0 | 2192 | 2110 |
| Example | A19 | Nb | 0.5 | 2180 | 2105 |
| Example | A20 |  | 2.0 | 2190 | 2105 |
| Example | A21 | Mo | 0.5 | 2190 | 2105 |
| Example | A22 |  | 2.0 | 2190 | 2100 |
| Example | A23 | Ta | 2.5 | 2190 | 2000 |
| Example | A24 | Al |  | 2192 | 2010 |
| Example | A25 | Zr |  | 2180 | 2000 |
| Example | A26 | Mg |  | 2185 | 2005 |
| Example | A27 | In |  | 2182 | 2000 |
| Example | A28 | Sn |  | 2190 | 2005 |
| Example | A29 | Mn |  | 2190 | 2002 |
| Example | A30 | B |  | 2189 | 2000 |
| Example | A31 | W |  | 2190 | 2010 |
| Example | A32 | Nb |  | 2190 | 2000 |
| Example | A33 | Mo |  | 2192 | 2000 |

Comparative Example Batteries a1 to a22

Nickel sulfate, cobalt sulfate, and aluminum sulfate were mixed so that the molar ratio between Ni atoms, Co atoms, and Al atoms was 80:15:4.98. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of the obtained Ni—Co—Al coprecipitated hydroxide, 784 g of lithium hydroxide and 0.49 g of calcium hydroxide were mixed, and the mixture was baked under a partial pressure of oxygen of 0.5 atmosphere, with a synthesizing temperature of 750° C. for 10 hours. As a result, a Ni—Co—Ca—Al lithium composite oxide containing Al as element Me ($LiNi_{0.8}Co_{0.15}Ca_{0.0002}Al_{0.0498}O_2$) was obtained. Comparative Example Batteries a1 to a22 were made in the same manner as Example Batteries A1 to A22, except that this lithium composite oxide was used as the raw material for the active material particles; and the evaluation same as Example 1 was carried out. The results are shown in Table 1B.

TABLE 1B

Composite Oxide
$LiNi_{0.8}Co_{0.15}Ca_{0.0002}Al_{0.0498}O_2$

| Battery No. | | Surface Coating Element | Amount Added (mol %) | Intermittent Cycle Performance Charge Rest | |
|---|---|---|---|---|---|
| | | | | 30 minutes at 45° C. (mAh) | 720 minutes at 45° C. (mAh) |
| Comp. Ex. | a1 | Ta | 0.5 | 2180 | 1900 |
| Comp. Ex. | a2 | | 2.0 | 2185 | 1900 |
| Comp. Ex. | a3 | Al | 0.5 | 2185 | 1905 |
| Comp. Ex. | a4 | | 2.0 | 2190 | 1905 |
| Comp. Ex. | a5 | Zr | 0.5 | 2190 | 1910 |
| Comp. Ex. | a6 | | 2.0 | 2190 | 1910 |
| Comp. Ex. | a7 | Mg | 0.5 | 2195 | 1915 |
| Comp. Ex. | a8 | | 2.0 | 2192 | 1920 |
| Comp. Ex. | a9 | In | 0.5 | 2190 | 1925 |
| Comp. Ex. | a10 | | 2.0 | 2195 | 1920 |
| Comp. Ex. | a11 | Sn | 0.5 | 2190 | 1910 |
| Comp. Ex. | a12 | | 2.0 | 2189 | 1905 |
| Comp. Ex. | a13 | Mn | 0.5 | 2190 | 1900 |
| Comp. Ex. | a14 | | 2.0 | 2191 | 1900 |
| Comp. Ex. | a15 | B | 0.5 | 2191 | 1900 |
| Comp. Ex. | a16 | | 2.0 | 2190 | 1905 |
| Comp. Ex. | a17 | W | 0.5 | 2190 | 1902 |
| Comp. Ex. | a18 | | 2.0 | 2192 | 1910 |
| Comp. Ex. | a19 | Nb | 0.5 | 2180 | 1905 |
| Comp. Ex. | a20 | | 2.0 | 2190 | 1905 |
| Comp. Ex. | a21 | Mo | 0.5 | 2190 | 1905 |
| Comp. Ex. | a22 | | 2.0 | 2190 | 1900 |

Comparative Example Batteries a23 to a44

Nickel sulfate, cobalt sulfate, and aluminum sulfate were mixed so that the molar ratio between Ni atoms, Co atoms, and Al atoms was 80:15:4.98. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of the obtained Ni—Co—Al coprecipitated hydroxide, 784 g of lithium hydroxide and 0.38 g of magnesium hydroxide were mixed, and the mixture was baked under a partial pressure of oxygen of 0.5 atmosphere, with a synthesizing temperature of 750° C. for 10 hours. As a result, a Ni—Co—Mg—Al lithium composite oxide containing Al as element Me ($LiNi_{0.8}Cu_{0.15}Mg_{0.0002}Al_{0.0498}O_2$) was obtained. Comparative Example Batteries a23 to a44 were made in the same manner as Example Batteries A1 to A22, respectively, except that this lithium composite oxide was used as the raw material of the active material particles; and the evaluation same as Example was carried out. The results are shown in Table 1C.

TABLE 1C

Composite Oxide
$LiNi_{0.8}Co_{0.15}Mg_{0.0002}Al_{0.0498}O_2$

| Battery No. | | Surface Coating Element | Amount Added (mol %) | Intermittent Cycle Performance Charge Rest | |
|---|---|---|---|---|---|
| | | | | 30 At 45° C. (mAh) | 720 at 45° C. (mAh) |
| Comp. Ex. | a23 | Ta | 0.5 | 2175 | 1905 |
| Comp. Ex. | a24 | | 2.0 | 2170 | 1900 |
| Comp. Ex. | a25 | Al | 0.5 | 2170 | 1905 |
| Comp. Ex. | a26 | | 2.0 | 2175 | 1905 |
| Comp. Ex. | a27 | Zr | 0.5 | 2172 | 1900 |
| Comp. Ex. | a28 | | 2.0 | 2172 | 1900 |
| Comp. Ex. | a29 | Mg | 0.5 | 2173 | 1902 |
| Comp. Ex. | a30 | | 2.0 | 2178 | 1905 |
| Comp. Ex. | a31 | In | 0.5 | 2176 | 1904 |
| Comp. Ex. | a32 | | 2.0 | 2177 | 1910 |
| Comp. Ex. | a33 | Sn | 0.5 | 2172 | 1905 |
| Comp. Ex. | a34 | | 2.0 | 2175 | 1902 |
| Comp. Ex. | a35 | Mn | 0.5 | 2175 | 1902 |
| Comp. Ex. | a36 | | 2.0 | 2174 | 1900 |
| Comp. Ex. | a37 | B | 0.5 | 2174 | 1901 |
| Comp. Ex. | a38 | | 2.0 | 2174 | 1900 |
| Comp. Ex. | a39 | W | 0.5 | 2175 | 1905 |
| Comp. Ex. | a40 | | 2.0 | 2175 | 1905 |
| Comp. Ex. | a41 | Nb | 0.5 | 2178 | 1907 |
| Comp. Ex. | a42 | | 2.0 | 2174 | 1908 |
| Comp. Ex. | a43 | Mo | 0.5 | 2175 | 1908 |
| Comp. Ex. | a44 | | 2.0 | 2176 | 1905 |

EXAMPLE 2

Example Batteries B1 to B33

Nickel sulfate, cobalt sulfate, aluminum sulfate, and manganese sulfate were mixed so that the molar ratio between Ni atoms, Co atoms, Al atoms, and Mn atoms was 80:15:3.96:1. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of a Ni—Co—Al—Mn coprecipitated hydroxide, 784 g of lithium hydroxide, 0.49 g of calcium hydroxide, and 0.38 g of magnesium hydroxide were mixed, and the mixture was baked under a partial pressure of oxygen of 0.5 atmosphere, with a synthesizing temperature of 750° C. for 10 hours. As a result, a Ni—Co—Ca—Mg—Al—Mn lithium composite oxide containing Al and Mn as element Me ($LiNi_{0.8}Co_{0.15}Ca_{0.0002}Mg_{0.0002}Al_{0.0396}Mn_{0.01}O_2$) was obtained. Example Batteries B1 to B33 were made in the same manner as Example Batteries A1 to A33, respectively, except that this lithium composite oxide was used as the raw material of the active material particles; and the evaluation same as Example 1 was carried out. The results are shown in Table 2A.

TABLE 2A

Composite Oxide $LiNi_{0.8}Co_{0.15}Ca_{0.0002}Mg_{0.0002}Al_{0.0396}Mn_{0.01}O_2$

| Battery No. | | Surface Coating Element | Amount Added (mol %) | Intermittent Cycle Performance Charge Rest | |
|---|---|---|---|---|---|
| | | | | 30 minutes at 45° C. (mAh) | 720 minutes At 45° C. (mAh) |
| Example | B1  | Ta | 0.5 | 2170 | 2120 |
| Example | B2  |    | 2.0 | 2175 | 2120 |
| Example | B3  | Al | 0.5 | 2170 | 2122 |
| Example | B4  |    | 2.0 | 2177 | 2125 |
| Example | B5  | Zr | 0.5 | 2175 | 2124 |
| Example | B6  |    | 2.0 | 2172 | 2122 |
| Example | B7  | Mg | 0.5 | 2173 | 2122 |
| Example | B8  |    | 2.0 | 2174 | 2120 |
| Example | B9  | In | 0.5 | 2175 | 2120 |
| Example | B10 |    | 2.0 | 2170 | 2125 |
| Example | B11 | Sn | 0.5 | 2170 | 2125 |
| Example | B12 |    | 2.0 | 2171 | 2125 |
| Example | B13 | Mn | 0.5 | 2171 | 2120 |
| Example | B14 |    | 2.0 | 2171 | 2120 |
| Example | B15 | B  | 0.5 | 2175 | 2120 |
| Example | B16 |    | 2.0 | 2175 | 2123 |
| Example | B17 | W  | 0.5 | 2175 | 2122 |
| Example | B18 |    | 2.0 | 2175 | 2124 |
| Example | B19 | Nb | 0.5 | 2170 | 2124 |
| Example | B20 |    | 2.0 | 2170 | 2125 |
| Example | B21 | Mo | 0.5 | 2170 | 2125 |
| Example | B22 |    | 2.0 | 2171 | 2125 |
| Example | B23 | Ta | 2.5 | 2171 | 2002 |
| Example | B24 | Al |     | 2172 | 2002 |
| Example | B25 | Zr |     | 2172 | 2000 |
| Example | B26 | Mg |     | 2170 | 2000 |
| Example | B27 | In |     | 2170 | 2000 |
| Example | B28 | Sn |     | 2171 | 2005 |
| Example | B29 | Mn |     | 2171 | 2004 |
| Example | B30 | B  |     | 2171 | 2003 |
| Example | B31 | W  |     | 2175 | 2003 |
| Example | B32 | Nb |     | 2170 | 2005 |
| Example | B33 | Mo |     | 2170 | 2000 |

TABLE 2B

Composite Oxide $LiNi_{0.8}Co_{0.15}Al_{0.04}Mn_{0.01}O_2$

| Battery No. | | Surface Coating Element | Amount Added (mol %) | Intermittent Cycle Performance Charge Rest | |
|---|---|---|---|---|---|
| | | | | 30 minutes at 45° C. (mAh) | 720 minutes at 45° C. (mAh) |
| Comp. Ex. | b1  | Ta | 0.5 | 2170 | 1891 |
| Comp. Ex. | b2  |    | 2.0 | 2172 | 1891 |
| Comp. Ex. | b3  | Al | 0.5 | 2172 | 1892 |
| Comp. Ex. | b4  |    | 2.0 | 2175 | 1890 |
| Comp. Ex. | b5  | Zr | 0.5 | 2175 | 1890 |
| Comp. Ex. | b6  |    | 2.0 | 2174 | 1892 |
| Comp. Ex. | b7  | Mg | 0.5 | 2174 | 1892 |
| Comp. Ex. | b8  |    | 2.0 | 2174 | 1892 |
| Comp. Ex. | b9  | In | 0.5 | 2170 | 1892 |
| Comp. Ex. | b10 |    | 2.0 | 2170 | 1895 |
| Comp. Ex. | b11 | Sn | 0.5 | 2171 | 1894 |
| Comp. Ex. | b12 |    | 2.0 | 2171 | 1897 |
| Comp. Ex. | b13 | Mn | 0.5 | 2172 | 1895 |
| Comp. Ex. | b14 |    | 2.0 | 2174 | 1896 |
| Comp. Ex. | b15 | B  | 0.5 | 2175 | 1897 |
| Comp. Ex. | b16 |    | 2.0 | 2173 | 1896 |
| Comp. Ex. | b17 | W  | 0.5 | 2170 | 1891 |
| Comp. Ex. | b18 |    | 2.0 | 2170 | 1892 |
| Comp. Ex. | b19 | Nb | 0.5 | 2171 | 1892 |
| Comp. Ex. | b20 |    | 2.0 | 2170 | 1896 |
| Comp. Ex. | b21 | Mo | 0.5 | 2170 | 1897 |
| Comp. Ex. | b22 |    | 2.0 | 2170 | 1897 |

Comparative Example Batteries b1 to b22

Nickel sulfate, cobalt sulfate, aluminum sulfate, and manganese sulfate were mixed so that the molar ratio between Ni atoms, Co atoms, Al atoms, and Mn atoms was 80:15:4:1. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of the obtained Ni—Co—Al—Mn coprecipitated hydroxide, 784 g of lithium hydroxide was mixed, and the mixture was baked under a partial pressure of oxygen of 0.5 atmosphere, with a synthesizing temperature of 750° C. for 10 hours. As a result, a Ni—Co—Al—Mn lithium composite oxide containing Al and Mn as element Me ($LiNi_{0.8}Co_{0.15}Al_{0.04}Mn_{0.01}O_2$) was obtained. Comparative Example Batteries b1 to b22 were made in the same manner as Example Batteries B1 to B22, respectively, except that this lithium composite oxide was used as the raw material of the active material particles; and the evaluation same as Example 1 was carried out. The results are shown in Table 2B.

EXAMPLE 3

Example Batteries C1 to C33

Nickel sulfate, cobalt sulfate, aluminum sulfate, and niobium nitrate were mixed so that the molar ratio between Ni atoms, Co atoms, Al atoms, and Nb atoms was 80:15:3.96:1. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of the obtained Ni—Co—Al—Nb coprecipitated hydroxide, 784 g of lithium hydroxide, 0.49 g of calcium hydroxide, and 0.38 g of magnesium hydroxide were mixed, and the mixture was baked under a partial pressure of oxygen of 0.5 atmosphere, with a synthesizing temperature of 750° C. for 10 hours. As a result, a Ni—Co—Ca—Mg—Al—Nb lithium composite oxide containing Al and Nb as element Me ($LiNi_{0.8}Co_{0.15}Ca_{0.0002}Mg_{0.0002}Al_{0.0396}Nb_{0.01}O_2$) was obtained. Example Batteries C1 to C33 were made in the same manner as Example Batteries A1 to A33, respectively, except that this lithium composite oxide was used as the raw material of the active material particles; and the evaluation same as Example 1 was carried out. The results are shown in Table 3A.

TABLE 3A

Composite Oxide
$LiNi_{0.8}Co_{0.15}Ca_{0.0002}Mg_{0.0002}Al_{0.0396}Nb_{0.01}O_2$

| Battery No. | | Surface Coating Element | Amount Added (mol %) | Intermittent Cycle Performance Charge Rest | |
|---|---|---|---|---|---|
| | | | | 30 minutes at 45° C. (mAh) | 720 minutes at 45° C. (mAh) |
| Example | C1 | Ta | 0.5 | 2177 | 2105 |
| Example | C2 |    | 2.0 | 2178 | 2102 |
| Example | C3 | Al | 0.5 | 2176 | 2100 |
| Example | C4 |    | 2.0 | 2175 | 2104 |
| Example | C5 | Zr | 0.5 | 2175 | 2103 |
| Example | C6 |    | 2.0 | 2176 | 2102 |
| Example | C7 | Mg | 0.5 | 2177 | 2102 |
| Example | C8 |    | 2.0 | 2177 | 2103 |
| Example | C9 | In | 0.5 | 2177 | 2104 |
| Example | C10 |   | 2.0 | 2178 | 2105 |
| Example | C11 | Sn | 0.5 | 2178 | 2104 |
| Example | C12 |    | 2.0 | 2179 | 2104 |
| Example | C13 | Mn | 0.5 | 2180 | 2105 |
| Example | C14 |    | 2.0 | 2180 | 2105 |
| Example | C15 | B | 0.5 | 2179 | 2104 |
| Example | C16 |   | 2.0 | 2179 | 2103 |
| Example | C17 | W | 0.5 | 2178 | 2102 |
| Example | C18 |   | 2.0 | 2175 | 2103 |
| Example | C19 | Nb | 0.5 | 2176 | 2103 |
| Example | C20 |    | 2.0 | 2177 | 2103 |
| Example | C21 | Mo | 0.5 | 2177 | 2105 |
| Example | C22 |    | 2.0 | 2177 | 2105 |
| Example | C23 | Ta | 2.5 | 2175 | 1990 |
| Example | C24 | Al |    | 2175 | 1990 |
| Example | C25 | Zr |    | 2176 | 1991 |
| Example | C26 | Mg |    | 2177 | 1992 |
| Example | C27 | In |    | 2178 | 1995 |
| Example | C28 | Sn |    | 2179 | 1995 |
| Example | C29 | Mn |    | 2174 | 1992 |
| Example | C30 | B |    | 2177 | 1992 |
| Example | C31 | W |    | 2170 | 1992 |
| Example | C32 | Nb |    | 2172 | 1991 |
| Example | C33 | Mo |    | 2171 | 1991 |

TABLE 3B

Composite Oxide
$LiNi_{0.8}Co_{0.15}Al_{0.04}Nb_{0.01}O_2$

| Battery No. | | Surface Coating Element | Amount Added (mol %) | Intermittent Cycle Performance Charge Rest | |
|---|---|---|---|---|---|
| | | | | 30 minutes at 45° C. (mAh) | 720 minutes at 45° C. (mAh) |
| Comp. Ex. | c1 | Ta | 0.5 | 2178 | 1880 |
| Comp. Ex. | c2 |    | 2.0 | 2177 | 1881 |
| Comp. Ex. | c3 | Al | 0.5 | 2178 | 1882 |
| Comp. Ex. | c4 |    | 2.0 | 2177 | 1884 |
| Comp. Ex. | c5 | Zr | 0.5 | 2175 | 1885 |
| Comp. Ex. | c6 |    | 2.0 | 2176 | 1884 |
| Comp. Ex. | c7 | Mg | 0.5 | 2177 | 1884 |
| Comp. Ex. | c8 |    | 2.0 | 2178 | 1882 |
| Comp. Ex. | c9 | In | 0.5 | 2177 | 1881 |
| Comp. Ex. | c10 |   | 2.0 | 2179 | 1883 |
| Comp. Ex. | c11 | Sn | 0.5 | 2178 | 1882 |
| Comp. Ex. | c12 |    | 2.0 | 2179 | 1884 |
| Comp. Ex. | c13 | Mn | 0.5 | 2175 | 1885 |
| Comp. Ex. | c14 |    | 2.0 | 2174 | 1884 |
| Comp. Ex. | c15 | B | 0.5 | 2176 | 1884 |
| Comp. Ex. | c16 |   | 2.0 | 2174 | 1886 |
| Comp. Ex. | c17 | W | 0.5 | 2177 | 1887 |
| Comp. Ex. | c18 |   | 2.0 | 2177 | 1888 |
| Comp. Ex. | c19 | Nb | 0.5 | 2176 | 1887 |
| Comp. Ex. | c20 |    | 2.0 | 2175 | 1887 |
| Comp. Ex. | c21 | Mo | 0.5 | 2177 | 1887 |
| Comp. Ex. | c22 |    | 2.0 | 2177 | 1887 |

Comparative Example Batteries c1 to c22

Nickel sulfate, cobalt sulfate, aluminum sulfate, and niobium nitrate were mixed so that the molar ratio between Ni atoms, Co atoms, Al atoms, and Nb atoms was 80:15:4:1. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of the obtained Ni—Co—Al—Nb coprecipitated hydroxide, 784 g of lithium hydroxide was mixed, and the mixture was baked under a partial pressure of oxygen of 0.5 atmosphere, with a synthesizing temperature of 750° C. for 10 hours, to obtain a Ni—Co—Al—Nb lithium composite oxide containing Al and Nb as element Me ($LiNi_{0.8}Cu_{0.15}Al_{0.04}Nb_{0.001}O_2$). Comparative Example Batteries c1 to c22 were made in the same manner as Example Batteries C1 to C22, respectively, except that this lithium composite oxide was used as the raw material of the active material particles; and the evaluation same as Example 1 was carried out. The results are shown in Table 3B.

EXAMPLE 4

Example Batteries D1 to D33

Nickel sulfate, cobalt sulfate, and titanium sulfate were mixed so that the molar ratio between Ni atoms, Co atoms, and Ti atoms was 75:15:9.96. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of the obtained Ni—Co—Ti coprecipitated hydroxide, 784 g of lithium hydroxide, 0.49 g of calcium hydroxide, and 0.38 g of magnesium hydroxide were mixed, and the mixture was baked under a partial pressure of oxygen of 0.5 atmosphere, with a synthesizing temperature of 750° C. for 10 hours. As a result, a Ni—Co—Ca—Mg—Ti lithium composite oxide containing Ti as element Me ($LiNi_{0.75}Co_{0.15}Ca_{0.0002}Mg_{0.0002}Ti_{0.0996}O_2$) was obtained. Example Batteries D1 to D33 were made in the same manner as Example Batteries A1 to A33, respectively, except that this lithium composite oxide was used as the raw material of the active material particles; and the evaluation same as Example 1 was carried out. The results are shown in Table 4.

TABLE 4

Composite Oxide
$LiNi_{0.75}Co_{0.15}Ca_{0.0002}Mg_{0.0002}Ti_{0.0996}O_2$

| Battery No. | | Surface Coating Element | Amount Added (mol %) | Intermittent Cycle Performance Charge Rest | |
|---|---|---|---|---|---|
| | | | | 30 minutes at 45° C. (mAh) | 720 minutes at 45° C. (mAh) |
| Example | D1 | Ta | 0.5 | 2190 | 2100 |
| Example | D2 | | 2.0 | 2190 | 2110 |
| Example | D3 | Al | 0.5 | 2190 | 2105 |
| Example | D4 | | 2.0 | 2180 | 2105 |
| Example | D5 | Zr | 0.5 | 2190 | 2120 |
| Example | D6 | | 2.0 | 2190 | 2110 |
| Example | D7 | Mg | 0.5 | 2191 | 2100 |
| Example | D8 | | 2.0 | 2192 | 2105 |
| Example | D9 | In | 0.5 | 2195 | 2110 |
| Example | D10 | | 2.0 | 2190 | 2100 |
| Example | D11 | Sn | 0.5 | 2190 | 2105 |
| Example | D12 | | 2.0 | 2195 | 2100 |
| Example | D13 | Mn | 0.5 | 2192 | 2102 |
| Example | D14 | | 2.0 | 2190 | 2110 |
| Example | D15 | B | 0.5 | 2180 | 2105 |
| Example | D16 | | 2.0 | 2191 | 2105 |
| Example | D17 | W | 0.5 | 2185 | 2105 |
| Example | D18 | | 2.0 | 2190 | 2125 |
| Example | D19 | Nb | 0.5 | 2190 | 2100 |
| Example | D20 | | 2.0 | 2185 | 2115 |
| Example | D21 | Mo | 0.5 | 2190 | 2120 |
| Example | D22 | | 2.0 | 2189 | 2100 |
| Example | D23 | Ta | 2.5 | 2190 | 2000 |
| Example | D24 | Al | | 2192 | 2000 |
| Example | D25 | Zr | | 2185 | 2000 |
| Example | D26 | Mg | | 2189 | 2000 |
| Example | D27 | In | | 2190 | 2005 |
| Example | D28 | Sn | | 2182 | 2010 |
| Example | D29 | Mn | | 2190 | 2005 |
| Example | D30 | B | | 2190 | 2000 |
| Example | D31 | W | | 2192 | 2010 |
| Example | D32 | Nb | | 2190 | 2002 |
| Example | D33 | Mo | | 2180 | 2000 |

TABLE 5

Composite Oxide
$LiNi_{0.75}Co_{0.15}Ca_{0.0002}Mg_{0.0002}Mn_{0.0996}O_2$

| Battery No. | | Surface Coating Element | Amount Added (mol %) | Intermittent Cycle Performance Charge Rest | |
|---|---|---|---|---|---|
| | | | | 30 minutes at 45° C. (mAh) | 720 minutes at 45° C. (mAh) |
| Example | E1 | Ta | 0.5 | 2190 | 2100 |
| Example | E2 | | 2.0 | 2190 | 2110 |
| Example | E3 | Al | 0.5 | 2190 | 2105 |
| Example | E4 | | 2.0 | 2180 | 2105 |
| Example | E5 | Zr | 0.5 | 2190 | 2120 |
| Example | E6 | | 2.0 | 2190 | 2110 |
| Example | E7 | Mg | 0.5 | 2191 | 2100 |
| Example | E8 | | 2.0 | 2192 | 2105 |
| Example | E9 | In | 0.5 | 2195 | 2110 |
| Example | E10 | | 2.0 | 2190 | 2100 |
| Example | E11 | Sn | 0.5 | 2190 | 2105 |
| Example | E12 | | 2.0 | 2195 | 2100 |
| Example | E13 | Mn | 0.5 | 2192 | 2102 |
| Example | E14 | | 2.0 | 2190 | 2110 |
| Example | E15 | B | 0.5 | 2180 | 2105 |
| Example | E16 | | 2.0 | 2191 | 2105 |
| Example | E17 | W | 0.5 | 2185 | 2105 |
| Example | E18 | | 2.0 | 2190 | 2125 |
| Example | E19 | Nb | 0.5 | 2190 | 2100 |
| Example | E20 | | 2.0 | 2185 | 2115 |
| Example | E21 | Mo | 0.5 | 2190 | 2120 |
| Example | E22 | | 2.0 | 2189 | 2100 |
| Example | E23 | Ta | 2.5 | 2190 | 2000 |
| Example | E24 | Al | | 2192 | 2000 |
| Example | E25 | Zr | | 2185 | 2000 |
| Example | E26 | Mg | | 2189 | 2000 |
| Example | E27 | In | | 2190 | 2005 |
| Example | E28 | Sn | | 2182 | 2010 |
| Example | E29 | Mn | | 2190 | 2005 |
| Example | E30 | B | | 2190 | 2000 |
| Example | E31 | W | | 2192 | 2010 |
| Example | E32 | Nb | | 2190 | 2002 |
| Example | E33 | Mo | | 2180 | 2000 |

EXAMPLE 5

Example Batteries E1 to E33

Nickel sulfate, cobalt sulfate, and manganese sulfate were mixed so that the molar ratio between Ni atoms, Co atoms, and Mn atoms was 75:15:9.96. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of the obtained Ni—Co—Mn coprecipitated hydroxide, 784 g of lithium hydroxide, 0.49 g of calcium hydroxide, and 0.38 g of magnesium hydroxide were mixed, and the mixture was baked under a partial pressure of oxygen of 0.5 atmosphere, with a synthesizing temperature of 750° C. for 10 hours. As a result, a Ni—Co—Ca—Mg—Mn lithium composite oxide containing Mn as element Me ($LiNi_{0.75}Co_{0.15}Ca_{0.0002}Mg_{0.0002}Mn_{0.0996}O_2$) was obtained. Example Batteries E1 to E33 were made in the same manner as Example Batteries A1 to A33, respectively, except that this lithium composite oxide was used as the raw material of the active material particles; and the evaluation same as Example 1 was carried out. The results are shown in Table 5.

EXAMPLE 6

Example Batteries F1 to F33

Nickel sulfate, cobalt sulfate, and niobium nitrate were mixed so that the molar ratio between Ni atoms, Co atoms, and Nb atoms was 75:15:9.96. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of the obtained Ni—Co—Nb coprecipitated hydroxide, 784 g of lithium hydroxide, 0.49 g of calcium hydroxide, and 0.38 g of magnesium hydroxide were mixed, and the mixture was baked under a partial pressure of oxygen of 0.5 atmosphere, with a synthesizing temperature of 750° C. for 10 hours. As a result, a Ni—Co—Ca—Mg—Nb lithium composite oxide containing Nb as element Me ($LiNi_{0.75}Co_{0.15}Ca_{0.0002}Mg_{0.0002}Nb_{0.0996}O_2$) was obtained. Example Batteries F1 to F33 were made in the same manner as Example Batteries A1 to A33, respectively, except that this lithium composite oxide was used as the raw material of the active material particles; and the evaluation same as Example 1 was carried out. The results are shown in Table 6.

TABLE 6

Composite Oxide
$LiNi_{0.75}Co_{0.15}Ca_{0.0002}Mg_{0.0002}Nb_{0.0996}O_2$

| Battery No. | | Surface Coating Element | Amount Added (mol %) | Intermittent Cycle Performance Charge Rest | |
|---|---|---|---|---|---|
| | | | | 30 minutes at 45° C. (mAh) | 720 minutes at 45° C. (mAh) |
| Example | F1  | Ta | 0.5 | 2190 | 2100 |
| Example | F2  |    | 2.0 | 2190 | 2110 |
| Example | F3  | Al | 0.5 | 2190 | 2105 |
| Example | F4  |    | 2.0 | 2180 | 2105 |
| Example | F5  | Zr | 0.5 | 2190 | 2120 |
| Example | F6  |    | 2.0 | 2190 | 2110 |
| Example | F7  | Mg | 0.5 | 2191 | 2100 |
| Example | F8  |    | 2.0 | 2192 | 2105 |
| Example | F9  | In | 0.5 | 2195 | 2110 |
| Example | F10 |    | 2.0 | 2190 | 2100 |
| Example | F11 | Sn | 0.5 | 2190 | 2105 |
| Example | F12 |    | 2.0 | 2195 | 2100 |
| Example | F13 | Mn | 0.5 | 2192 | 2102 |
| Example | F14 |    | 2.0 | 2190 | 2110 |
| Example | F15 | B  | 0.5 | 2180 | 2105 |
| Example | F16 |    | 2.0 | 2191 | 2105 |
| Example | F17 | W  | 0.5 | 2185 | 2105 |
| Example | F18 |    | 2.0 | 2190 | 2125 |
| Example | F19 | Nb | 0.5 | 2190 | 2100 |
| Example | F20 |    | 2.0 | 2185 | 2115 |
| Example | F21 | Mo | 0.5 | 2190 | 2120 |
| Example | F22 |    | 2.0 | 2189 | 2100 |
| Example | F23 | Ta | 2.5 | 2189 | 2005 |
| Example | F24 | Al |     | 2190 | 2002 |
| Example | F25 | Zr |     | 2180 | 2000 |
| Example | F26 | Mg |     | 2190 | 2000 |
| Example | F27 | In |     | 2190 | 2000 |
| Example | F28 | Sn |     | 2185 | 2000 |
| Example | F29 | Mn |     | 2190 | 2000 |
| Example | F30 | B  |     | 2190 | 2010 |
| Example | F31 | W  |     | 2182 | 2000 |
| Example | F32 | Nb |     | 2192 | 2005 |
| Example | F33 | Mo |     | 2192 | 2010 |

Comparative Example Batteries g1 to g22

Nickel sulfate and cobalt sulfate were mixed so that the molar ratio of Ni atoms to Co atoms was 80:20. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of the obtained Ni—Co coprecipitated hydroxide, 784 g of lithium hydroxide was mixed, and the mixture was baked under a partial pressure of oxygen of 0.5 atmosphere, with a synthesizing temperature of 750° C. for 10 hours. As a result, a Ni—Co lithium composite oxide ($LiNi_{0.8}Co_{0.2}O_2$) was obtained. Comparative Example Batteries g1 to g22 were made in the same manner as Example Batteries A1 to A22, respectively, except that this lithium composite oxide was used as the raw material of the active material particles; and the evaluation same as Example 1 was carried out. The results are shown in Table 7.

TABLE 7

Composite Oxide
$LiNi_{0.8}Co_{0.2}O_2$

| Battery No. | | Surface Coating Element | Amount Added (mol %) | Intermittent Cycle Performance Charge Rest | |
|---|---|---|---|---|---|
| | | | | 30 minutes at 45° C. (mAh) | 720 minutes At 45° C. (mAh) |
| Comp. Ex. | g1  | Ta | 0.5 | 2174 | 1905 |
| Comp. Ex. | g2  |    | 2.0 | 2177 | 1905 |
| Comp. Ex. | g3  | Al | 0.5 | 2178 | 1905 |
| Comp. Ex. | g4  |    | 2.0 | 2174 | 1900 |
| Comp. Ex. | g5  | Zr | 0.5 | 2175 | 1900 |
| Comp. Ex. | g6  |    | 2.0 | 2175 | 1900 |
| Comp. Ex. | g7  | Mg | 0.5 | 2175 | 1902 |
| Comp. Ex. | g8  |    | 2.0 | 2175 | 1905 |
| Comp. Ex. | g9  | In | 0.5 | 2173 | 1902 |
| Comp. Ex. | g10 |    | 2.0 | 2175 | 1900 |
| Comp. Ex. | g11 | Sn | 0.5 | 2175 | 1905 |
| Comp. Ex. | g12 |    | 2.0 | 2174 | 1910 |
| Comp. Ex. | g13 | Mn | 0.5 | 2174 | 1907 |
| Comp. Ex. | g14 |    | 2.0 | 2172 | 1905 |
| Comp. Ex. | g15 | B  | 0.5 | 2175 | 1907 |
| Comp. Ex. | g16 |    | 2.0 | 2176 | 1904 |
| Comp. Ex. | g17 | W  | 0.5 | 2174 | 1900 |
| Comp. Ex. | g18 |    | 2.0 | 2174 | 1901 |
| Comp. Ex. | g19 | Nb | 0.5 | 2172 | 1900 |
| Comp. Ex. | g20 |    | 2.0 | 2175 | 1910 |
| Comp. Ex. | g21 | Mo | 0.5 | 2174 | 1908 |
| Comp. Ex. | g22 |    | 2.0 | 2190 | 1905 |

Comparative Example Batteries h1 to h22

Nickel sulfate and magnesium sulfate were mixed so that the molar ratio of Ni atoms to Mg atoms was 80:20. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of the obtained Ni—Mg coprecipitated hydroxide, 784 g of lithium hydroxide was mixed, and the mixture was baked under a partial pressure of oxygen of 0.5 atmosphere, with a synthesizing temperature of 750° C. for 10 hours. As a result, a Ni—Mg lithium composite oxide ($LiNi_{0.8}Mg_{0.2}O_2$) was obtained. Comparative Example Batteries h1 to h22 were made in the same manner as Example Batteries A1 to A22, respectively, except that this lithium composite oxide was used as the raw material of the active material particles; and the evaluation same as Example 1 was carried out. The results are shown in Table 8.

TABLE 8

Composite Oxide
$LiNi_{0.8}Mg_{0.2}O_2$

| Battery No. | | Surface Coating Element | Amount Added (mol %) | Intermittent Cycle Performance Charge Rest | |
|---|---|---|---|---|---|
| | | | | 30 minutes at 45° C. (mAh) | 720 minutes At 45° C. (mAh) |
| Comp. Ex. | h1 | Ta | 0.5 | 2177 | 1920 |
| Comp. Ex. | h2 |    | 2.0 | 2176 | 1908 |
| Comp. Ex. | h3 | Al | 0.5 | 2190 | 1905 |
| Comp. Ex. | h4 |    | 2.0 | 2190 | 1910 |

TABLE 8-continued

Composite Oxide $LiNi_{0.8}Mg_{0.2}O_2$

| Battery No. | | Surface Coating Element | Amount Added (mol %) | Intermittent Cycle Performance Charge Rest | |
|---|---|---|---|---|---|
| | | | | 30 minutes at 45° C. (mAh) | 720 minutes At 45° C. (mAh) |
| Comp. Ex. | h5 | Zr | 0.5 | 2170 | 1901 |
| Comp. Ex. | h6 | | 2.0 | 2170 | 1905 |
| Comp. Ex. | h7 | Mg | 0.5 | 2175 | 1900 |
| Comp. Ex. | h8 | | 2.0 | 2195 | 1900 |
| Comp. Ex. | h9 | In | 0.5 | 2172 | 1905 |
| Comp. Ex. | h10 | | 2.0 | 2174 | 1915 |
| Comp. Ex. | h11 | Sn | 0.5 | 2170 | 1905 |
| Comp. Ex. | h12 | | 2.0 | 2175 | 1905 |
| Comp. Ex. | h13 | Mn | 0.5 | 2178 | 1904 |
| Comp. Ex. | h14 | | 2.0 | 2172 | 1900 |
| Comp. Ex. | h15 | B | 0.5 | 2170 | 1900 |
| Comp. Ex. | h16 | | 2.0 | 2191 | 1904 |
| Comp. Ex. | h17 | W | 0.5 | 2180 | 1900 |
| Comp. Ex. | h18 | | 2.0 | 2175 | 1908 |
| Comp. Ex. | h19 | Nb | 0.5 | 2175 | 1905 |
| Comp. Ex. | h20 | | 2.0 | 2190 | 1905 |
| Comp. Ex. | h21 | Mo | 0.5 | 2176 | 1900 |
| Comp. Ex. | h22 | | 2.0 | 2172 | 1904 |

Comparative Example Batteries i1 to i22

Nickel sulfate and calcium sulfate were mixed so that the molar ratio of Ni atoms to Ca atoms was 80:20. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of the obtained Ni—Ca coprecipitated hydroxide, 784 g of lithium hydroxide was mixed, and the mixture was baked under a partial pressure of oxygen of 0.5 atmosphere, with a synthesizing temperature of 750° C. for 10 hours. As a result, a Ni—Ca lithium composite oxide ($LiNi_{0.8}Ca_{0.2}O_2$) was obtained. Comparative Example Batteries i1 to i22 were made in the same manner as Example Batteries A1 to A22, respectively, except that this lithium composite oxide was used as the raw material of the active material particles; and the evaluation same as Example 1 was carried out. The results are shown in Table 9.

TABLE 9

Composite Oxide $LiNi_{0.8}Ca_{0.2}O_2$

| Battery No. | | Surface Coating Element | Amount Added (mol %) | Intermittent Cycle Performance Charge Rest | |
|---|---|---|---|---|---|
| | | | | 30 minutes at 45° C. (mAh) | 720 minutes At 45° C. (mAh) |
| Comp. Ex. | i1 | Ta | 0.5 | 2189 | 1910 |
| Comp. Ex. | i2 | | 2.0 | 2174 | 1902 |
| Comp. Ex. | i3 | Al | 0.5 | 2173 | 1905 |
| Comp. Ex. | i4 | | 2.0 | 2178 | 1910 |
| Comp. Ex. | i5 | Zr | 0.5 | 2190 | 1905 |
| Comp. Ex. | i6 | | 2.0 | 2176 | 1905 |
| Comp. Ex. | i7 | Mg | 0.5 | 2177 | 1907 |
| Comp. Ex. | i8 | | 2.0 | 2178 | 1902 |

TABLE 9-continued

Composite Oxide $LiNi_{0.8}Ca_{0.2}O_2$

| Battery No. | | Surface Coating Element | Amount Added (mol %) | Intermittent Cycle Performance Charge Rest | |
|---|---|---|---|---|---|
| | | | | 30 minutes at 45° C. (mAh) | 720 minutes At 45° C. (mAh) |
| Comp. Ex. | i9 | In | 0.5 | 2176 | 1902 |
| Comp. Ex. | i10 | | 2.0 | 2172 | 1905 |
| Comp. Ex. | i11 | Sn | 0.5 | 2172 | 1908 |
| Comp. Ex. | i12 | | 2.0 | 2175 | 1901 |
| Comp. Ex. | i13 | Mn | 0.5 | 2190 | 1900 |
| Comp. Ex. | i14 | | 2.0 | 2170 | 1900 |
| Comp. Ex. | i15 | B | 0.5 | 2170 | 1907 |
| Comp. Ex. | i16 | | 2.0 | 2172 | 1905 |
| Comp. Ex. | i17 | W | 0.5 | 2172 | 1905 |
| Comp. Ex. | i18 | | 2.0 | 2176 | 1905 |
| Comp. Ex. | i19 | Nb | 0.5 | 2175 | 1902 |
| Comp. Ex. | i20 | | 2.0 | 2170 | 1908 |
| Comp. Ex. | i21 | Mo | 0.5 | 2174 | 1905 |
| Comp. Ex. | i22 | | 2.0 | 2185 | 1908 |

Comparative Example Batteries j1 to j22

Nickel sulfate, cobalt sulfate, and magnesium sulfate were mixed so that the molar ratio between Ni atoms, Co atoms, and Mg atoms was 80:15:5. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of the obtained Ni—Co—Mg coprecipitated hydroxide, 784 g of lithium hydroxide was mixed, and the mixture was baked under a partial pressure of oxygen of 0.5 atmosphere, with a synthesizing temperature of 750° C. for 10 hours. As a result, a Ni—Co—Mg lithium composite oxide ($LiNi_{0.8}Co_{0.15}Mg_{0.05}O_2$) was obtained. Comparative Example Batteries j1 to j22 were made in the same manner as Example Batteries A1 to A22, respectively, except that this lithium composite oxide was used as the raw material of the active material particles; and the evaluation same as Example 1 was carried out. The results are shown in Table 10.

TABLE 10

Composite Oxide $LiNi_{0.8}Co_{0.15}Mg_{0.05}O_2$

| Battery No. | | Surface Coating Element | Amount Added (mol %) | Intermittent Cycle Performance Charge Rest | |
|---|---|---|---|---|---|
| | | | | 30 minutes at 45° C. (mAh) | 720 minutes at 45° C. (mAh) |
| Comp. Ex. | j1 | Ta | 0.5 | 2175 | 1905 |
| Comp. Ex. | j2 | | 2.0 | 2175 | 1905 |
| Comp. Ex. | j3 | Al | 0.5 | 2174 | 1905 |
| Comp. Ex. | j4 | | 2.0 | 2174 | 1900 |
| Comp. Ex. | j5 | Zr | 0.5 | 2172 | 1901 |
| Comp. Ex. | j6 | | 2.0 | 2170 | 1905 |
| Comp. Ex. | j7 | Mg | 0.5 | 2174 | 1905 |
| Comp. Ex. | j8 | | 2.0 | 2195 | 1902 |
| Comp. Ex. | j9 | In | 0.5 | 2175 | 1902 |
| Comp. Ex. | j10 | | 2.0 | 2177 | 1902 |
| Comp. Ex. | j11 | Sn | 0.5 | 2175 | 1920 |

TABLE 10-continued

Composite Oxide $LiNi_{0.8}Co_{0.15}Mg_{0.05}O_2$

| Battery No. | | Surface Coating Element | Amount Added (mol %) | Intermittent Cycle Performance Charge Rest | |
|---|---|---|---|---|---|
| | | | | 30 minutes at 45° C. (mAh) | 720 minutes at 45° C. (mAh) |
| Comp. Ex. | j12 | | 2.0 | 2175 | 1900 |
| Comp. Ex. | j13 | Mn | 0.5 | 2177 | 1902 |
| Comp. Ex. | j14 | | 2.0 | 2175 | 1905 |
| Comp. Ex. | j15 | B | 0.5 | 2174 | 1907 |
| Comp. Ex. | j16 | | 2.0 | 2185 | 1902 |
| Comp. Ex. | j17 | W | 0.5 | 2190 | 1902 |
| Comp. Ex. | j18 | | 2.0 | 2173 | 1910 |
| Comp. Ex. | j19 | Nb | 0.5 | 2174 | 1905 |
| Comp. Ex. | j20 | | 2.0 | 2174 | 1905 |
| Comp. Ex. | j21 | Mo | 0.5 | 2192 | 1902 |
| Comp. Ex. | j22 | | 2.0 | 2175 | 1900 |

Comparative Example Batteries k1 to k22

Nickel sulfate, cobalt sulfate, and calcium sulfate were mixed so that the molar ratio between Ni atoms, Co atoms, and Ca atoms was 80:15:5. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of the obtained Ni—Co—Ca coprecipitated hydroxide, 784 g of lithium hydroxide was mixed, and the mixture was baked under a partial pressure of oxygen of 0.5 atmosphere, with a synthesizing temperature of 750° C. for 10 hours. As a result, a Ni—Co—Ca lithium composite oxide ($LiNi_{0.8}Co_{0.15}Ca_{0.05}O_2$) was obtained. Comparative Example Batteries k1 to k22 were made in the same manner as Example Batteries A1 to A22, respectively, except that this lithium composite oxide was used as the raw material of the active material particles; and the evaluation same as Example 1 was carried out. The results are shown in Table 11.

TABLE 11

Composite Oxide $LiNi_{0.8}Co_{0.15}Ca_{0.05}O_2$

| Battery No. | | Surface Coating Element | Amount Added (mol %) | Intermittent Cycle Performance Charge Rest | |
|---|---|---|---|---|---|
| | | | | 30 minutes at 45° C. (mAh) | 720 minutes At 45° C. (mAh) |
| Comp. Ex. | k1 | Ta | 0.5 | 2175 | 1908 |
| Comp. Ex. | k2 | | 2.0 | 2175 | 1910 |
| Comp. Ex. | k3 | Al | 0.5 | 2190 | 1900 |
| Comp. Ex. | k4 | | 2.0 | 2192 | 1905 |
| Comp. Ex. | k5 | Zr | 0.5 | 2180 | 1908 |
| Comp. Ex. | k6 | | 2.0 | 2191 | 1905 |
| Comp. Ex. | k7 | Mg | 0.5 | 2178 | 1905 |
| Comp. Ex. | k8 | | 2.0 | 2175 | 1900 |
| Comp. Ex. | k9 | In | 0.5 | 2170 | 1905 |
| Comp. Ex. | k10 | | 2.0 | 2178 | 1900 |
| Comp. Ex. | k11 | Sn | 0.5 | 2175 | 1900 |
| Comp. Ex. | k12 | | 2.0 | 2174 | 1905 |
| Comp. Ex. | k13 | Mn | 0.5 | 2175 | 1905 |
| Comp. Ex. | k14 | | 2.0 | 2175 | 1900 |
| Comp. Ex. | k15 | B | 0.5 | 2176 | 1904 |
| Comp. Ex. | k16 | | 2.0 | 2175 | 1905 |
| Comp. Ex. | k17 | W | 0.5 | 2175 | 1900 |
| Comp. Ex. | k18 | | 2.0 | 2178 | 1901 |
| Comp. Ex. | k19 | Nb | 0.5 | 2175 | 1900 |
| Comp. Ex. | k20 | | 2.0 | 2178 | 1905 |
| Comp. Ex. | k21 | Mo | 0.5 | 2178 | 1905 |
| Comp. Ex. | k22 | | 2.0 | 2175 | 1905 |

Comparative Example Batteries l1 to l22

Nickel sulfate, magnesium sulfate, and calcium sulfate were mixed so that the molar ratio between Ni atoms, Mg atoms, and Ca atoms was 80:15:5. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of the obtained Ni—Mg—Ca coprecipitated hydroxide, 784 g of lithium hydroxide was mixed, and the mixture was baked under a partial pressure of oxygen of 0.5 atmosphere, with a synthesizing temperature of 750° C. for 10 hours. As a result, a Ni—Mg—Ca lithium composite oxide ($LiNi_{0.8}Mg_{0.15}Ca_{0.05}O_2$) was obtained. Comparative Example Batteries l1 to l22 were made in the same manner as Example Batteries A1 to A22, respectively, except that this lithium composite oxide was used as the raw material of the active material particles; and the evaluation same as Example 1 was carried out. The results are shown in Table 12.

TABLE 12

Composite Oxide $LiNi_{0.8}Mg_{0.15}Ca_{0.05}O_2$

| Battery No. | | Surface Coating Element | Amount Added (mol %) | Intermittent Cycle Performance Charge Rest | |
|---|---|---|---|---|---|
| | | | | 30 minutes at 45° C. (mAh) | 720 minutes at 45° C. (mAh) |
| Comp. Ex. | l1 | Ta | 0.5 | 2172 | 1905 |
| Comp. Ex. | l2 | | 2.0 | 2174 | 1900 |
| Comp. Ex. | l3 | Al | 0.5 | 2172 | 1908 |
| Comp. Ex. | l4 | | 2.0 | 2175 | 1925 |
| Comp. Ex. | l5 | Zr | 0.5 | 2173 | 1908 |
| Comp. Ex. | l6 | | 2.0 | 2190 | 1900 |
| Comp. Ex. | l7 | Mg | 0.5 | 2175 | 1905 |
| Comp. Ex. | l8 | | 2.0 | 2190 | 1905 |
| Comp. Ex. | l9 | In | 0.5 | 2175 | 1902 |
| Comp. Ex. | l10 | | 2.0 | 2176 | 1900 |
| Comp. Ex. | l11 | Sn | 0.5 | 2172 | 1910 |
| Comp. Ex. | l12 | | 2.0 | 2172 | 1905 |
| Comp. Ex. | l13 | Mn | 0.5 | 2176 | 1900 |
| Comp. Ex. | l14 | | 2.0 | 2175 | 1905 |
| Comp. Ex. | l15 | B | 0.5 | 2190 | 1900 |
| Comp. Ex. | l16 | | 2.0 | 2178 | 1900 |
| Comp. Ex. | l17 | W | 0.5 | 2176 | 1902 |

TABLE 12-continued

Composite Oxide
$LiNi_{0.8}Mg_{0.15}Ca_{0.05}O_2$

| Battery No. | | Surface Coating Element | Amount Added (mol %) | Intermittent Cycle Performance Charge Rest | |
|---|---|---|---|---|---|
| | | | | 30 minutes at 45° C. (mAh) | 720 minutes at 45° C. (mAh) |
| Comp. Ex. | 118 | | 2.0 | 2172 | 1902 |
| Comp. Ex. | 119 | Nb | 0.5 | 2174 | 1900 |
| Comp. Ex. | 120 | | 2.0 | 2173 | 1910 |
| Comp. Ex. | 121 | Mo | 0.5 | 2174 | 1905 |
| Comp. Ex. | 122 | | 2.0 | 2170 | 1905 |

Comparative Example Batteries m1 to m3

Battery m1 was made in the same manner as Battery A1, except that in the first step of synthesizing the active material particles, an ethanol solution of vanadium triethoxide oxide was used instead of the ethanol solution of pentaethoxytantalum; and the evaluation same as Example 1 was carried out. The results are shown in Table 13.

Battery m2 was made in the same manner as Battery A1, except that in the first step of synthesizing the active material particles, an isopropanol solution of diisopropoxycobalt was used instead of the ethanol solution of pentaethoxytantalum; and the evaluation same as Example 1 was carried out. The results are shown in Table 13.

Battery m3 was made in the same manner as battery A1, except that in the first step of synthesizing the active material particles, an ethanol solution of diethoxystrontium was used instead of the ethanol solution of pentaethoxytantalum; and the evaluation same as Example 1 was carried out. The results are shown in Table 13.

Comparative Example Batteries n1 to n3

Batteries n1 to n3 were made in the same manner as Batteries m1 to m3, except that $LiNi_{0.8}Co_{0.15}Ca_{0.0002}Mg_{0.0002}Al_{0.0396}Mn_{0.01}O_2$ was used as the lithium composite oxide; and the evaluation same as Example 1 was carried out. The results are shown in Table 13.

Comparative Example Batteries o1 to o3

Batteries o1 to o3 were made in the same manner as Batteries m1 to m3, except that $LiNi_{0.8}Co_{0.15}Ca_{0.0002}Mg_{0.0002}Al_{0.0396}Nb_{0.01}O_2$ was used as the lithium composite oxide; and the evaluation same as Example 1 was carried out. The results are shown in Table 13.

Comparative Example Batteries p1 to p3

Batteries p1 to p3 were made in the same manner as Batteries m1 to m3, except that $LiNi_{0.75}Co_{0.15}Ca_{0.0002}Mg_{0.0002}Ti_{0.0996}O_2$ was used as the lithium composite oxide; and the evaluation same as Example 1 was carried out. The results are shown in Table 14.

Comparative Example Batteries q1 to q3

Batteries q1 to q3 were made in the same manner as Batteries m1 to m3, except that $LiNi_{0.75}Co_{0.15}Ca_{0.0002}Mg_{0.0002}Mn_{0.0996}O_2$ was used as the lithium composite oxide; and the evaluation same as Example 1 was carried out. The results are shown in Table 14.

Comparative Example Batteries r1 to r3

Batteries r1 to r3 were made in the same manner as Batteries m1 to m3, except that $LiNi_{0.75}Co_{0.15}Ca_{0.0002}Mg_{0.0002}Nb_{0.0996}O_2$ was used as the lithium composite oxide; and the evaluation same as Example 1 was carried out. The results are shown in Table 14.

TABLE 13

| Battery No. | | Surface Coating Element | Amount Added (mol %) | Intermittent Cycle Performance Charge Rest | |
|---|---|---|---|---|---|
| | | | | 30 minutes At 45° C. (mAh) | 720 minutes at 45° C. (mAh) |
| Composite Oxide $LiNi_{0.8}Co_{0.15}Ca_{0.0002}Mg_{0.0002}Al_{0.00496}O_2$ | | | | | |
| Comp. Ex. | m1 | V | 0.5 | 2180 | 1905 |
| Comp. Ex. | m2 | Co | 0.5 | 2185 | 1907 |
| Comp. Ex. | m3 | Sr | 0.5 | 2185 | 1900 |
| Composite Oxide $LiNi_{0.8}Co_{0.15}Ca_{0.0002}Mg_{0.0002}Al_{0.0396}Mn_{0.01}O_2$ | | | | | |
| Comp. Ex. | n1 | V | 0.5 | 2180 | 1905 |
| Comp. Ex. | n2 | Co | 0.5 | 2185 | 1904 |
| Comp. Ex. | n3 | Sr | 0.5 | 2185 | 1908 |
| Composite Oxide $LiNi_{0.8}Co_{0.15}Ca_{0.0002}Mg_{0.0002}Al_{0.0396}Nb_{0.01}O_2$ | | | | | |
| Comp. Ex. | o1 | V | 0.5 | 2180 | 1900 |
| Comp. Ex. | o2 | Co | 0.5 | 2185 | 1902 |
| Comp. Ex. | o3 | Sr | 0.5 | 2185 | 1900 |

TABLE 14

| Battery No. | | Surface Coating Element | Amount Added (mol %) | Intermittent Cycle Performance Charge Rest | |
|---|---|---|---|---|---|
| | | | | 30 minutes at 45° C. (mAh) | 720 minutes At 45° C. (mAh) |
| Composite Oxide $LiNi_{0.75}Co_{0.15}Ca_{0.0002}Mg_{0.0002}Ti_{0.0996}O_2$ | | | | | |
| Comp. Ex. | p1 | V | 0.5 | 2180 | 1907 |
| Comp. Ex. | p2 | Co | 0.5 | 2185 | 1900 |
| Comp. Ex. | p3 | Sr | 0.5 | 2185 | 1905 |
| Composite Oxide $LiNi_{0.75}Co_{0.15}Ca_{0.0002}Mg_{0.0002}Mn_{0.0996}O_2$ | | | | | |
| Comp. Ex. | q1 | V | 0.5 | 2180 | 1905 |
| Comp. Ex. | q2 | Co | 0.5 | 2185 | 1910 |
| Comp. Ex. | q3 | Sr | 0.5 | 2185 | 1900 |
| Composite Oxide $LiNi_{0.75}Co_{0.15}Ca_{0.0002}Mg_{0.0002}Nb_{0.0996}O_2$ | | | | | |
| Comp. Ex. | r1 | V | 0.5 | 2180 | 1905 |
| Comp. Ex. | r2 | Co | 0.5 | 2190 | 1910 |
| Comp. Ex. | r3 | Sr | 0.5 | 2190 | 1900 |

Although evaluations were also carried out for lithium composite oxides synthesized by using various raw materials instead of the above coprecipitated hydroxides, descriptions for such evaluations are omitted.

INDUSTRIAL APPLICABILITY

The present invention is useful for a lithium ion secondary battery including a lithium composite oxide composed mainly of nickel as the positive electrode active material. Based on the present invention, cycle performance in repetitive intermittent cycle (a charge and discharge cycle with a long rest time after charging) assuming actual usage conditions can be improved more than conventionally achieved.

The form of the lithium ion secondary battery of the present invention is not particularly limited, and the form may be for example, any of coin-type, button-type, sheet-type, cylindrical-type, flat-type, and prismatic-type. The embodiment of the electrode assembly comprising a positive electrode, a negative electrode, and a separator may be wound-type and stack-type. The size of the battery may be a small size, for usage in a small portable devices, or a large size, for usage in electric vehicles. The lithium ion secondary battery of the present invention may be used, for example, for a power source for personal data assistants, portable electronic devices, small-size household electrical energy storage devices, motorcycles, electric vehicles, and hybrid electric vehicles. However, the application is not particularly limited.

The invention claimed is:

1. A lithium ion secondary battery comprising:
   a positive electrode capable of charging and discharging;
   a negative electrode capable of charging and discharging; and
   a non-aqueous electrolyte;
   said positive electrode including active material particles having a surface layer portion and an inner portion,
   said active material particles including a lithium composite oxide,
   said lithium composite oxide being represented by:

$Li_vNi_{1-w-x-y-z}Co_wCa_xMg_yM_zO_2$ where $0.85 \leq v \leq 1.25$, $0 < w \leq 0.75$, $0 < x \leq 0.1$, $0 < y \leq 0.1$, $0 \leq z \leq 0.5$, $0 < w+x+y+z \leq 0.80$, wherein
   said element M includes at least one selected from the group consisting of Mn, Al, B, W, Nb, Ta, In, Mo, Sn, Ti, Zr, and Y, and
   said surface layer portion includes at least one element Mc selected from the group consisting of Ca, Mg, Mn, Al, B, W, Nb, Ta, In, Mo, Sn, Ti, Zr, and Y,
   a concentration of said element Mc in said surface layer portion is higher than a total concentration of Ca, Mg and said element M in said inner portion of said active material particles.

2. The lithium ion secondary battery in accordance with claim 1,
   wherein said surface layer portion of said active material particles includes said element Mc forming a crystal structure different than a crystal structure of said lithium composite oxide in said inner portion.

3. The lithium ion secondary battery in accordance with claim 2, wherein in said surface layer portion, said element Mc forms an oxide having said crystal structure different from said lithium composite oxide.

4. The lithium ion secondary battery in accordance with claim 2, wherein the amount of said element Mc forming said crystal structure different from said crystal structure of said lithium composite oxide is 2 mol % or less relative to said lithium composite oxide.

5. The lithium ion secondary battery in accordance with claim 1, wherein an average particle size of said active material particles is 10 μm or more and 30 μm or less.

6. The lithium ion secondary battery in accordance with claim 1, wherein said non-aqueous electrolyte includes at least one selected from the group consisting of vinylene carbonate, vinylethylene carbonate, phosphazene, and fluorobenzene.

* * * * *